(12) United States Patent
Nomoto

(10) Patent No.: US 9,317,474 B2
(45) Date of Patent: Apr. 19, 2016

(54) SEMICONDUCTOR DEVICE

(71) Applicant: Renesas Electronics Corporation, Kawasaki-shi, Kanagawa (JP)

(72) Inventor: Shohei Nomoto, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 438 days.

(21) Appl. No.: 13/958,575

(22) Filed: Aug. 4, 2013

(65) Prior Publication Data

US 2014/0047212 A1 Feb. 13, 2014

(30) Foreign Application Priority Data

Aug. 7, 2012 (JP) .................................. 2012-175043

(51) Int. Cl.
*G06F 7/06* (2006.01)
*G06F 15/80* (2006.01)

(52) U.S. Cl.
CPC ..................................... *G06F 15/80* (2013.01)

(58) Field of Classification Search
CPC ....................................................... G06F 7/04
See application file for complete search history.

(56) References Cited

U.S. PATENT DOCUMENTS

| | | | | | |
|---|---|---|---|---|---|
| 4,896,265 A | * | 1/1990 | Fiduccia | ............. | G06F 15/8023 712/28 |
| 5,542,074 A | * | 7/1996 | Kim | ...................... | G06F 9/3885 712/22 |
| 6,098,163 A | * | 8/2000 | Guttag | .................... | G06F 5/015 712/20 |

FOREIGN PATENT DOCUMENTS

| | | |
|---|---|---|
| JP | 04-295953 A | 10/1992 |
| JP | 2007-073010 A | 3/2007 |
| JP | 2009-123074 A | 6/2009 |

OTHER PUBLICATIONS

Kyo, S., "An integrated memory array processor architecture for embedded image recognition systems", ISCA2005.

* cited by examiner

*Primary Examiner* — Cheng-Yuan Tseng
(74) *Attorney, Agent, or Firm* — Shapiro, Gabor and Rosenberger, PLLC

(57) ABSTRACT

A semiconductor device of the present invention has processor elements each of which divides data that is contiguous in one direction into multiple data groups and processes them, a processor element control unit that issues a data shift instruction, and a data transfer network that performs data transfer between adjacent processor elements. The processor elements each have a data storage unit that stores one of the multiple data groups, a data selector that outputs transfer data obtained by selecting either of head data or end data of one data group according to a data shift instruction into a data transfer network, a data shifter that shifts a position at which the data group is stored to the right or to the left according to the data shift instruction, and a data connector that connects the data group which is shifted and the transfer data obtained through the data transfer network.

6 Claims, 20 Drawing Sheets

SEMICONDUCTOR DEVICE

CROSS-REFERENCE TO RELATED APPLICATIONS

The disclosure of Japanese Patent Application No. 2012-175043 filed on Aug. 7, 2012 including the specification, drawings and abstract is incorporated herein by reference in its entirety.

BACKGROUND

The present invention relates to a semiconductor device and more specifically to a semiconductor device that performs an arithmetic operation on multiple data in a parallel manner using multiple processors each for performing an arithmetic operation on data.

In recent years, in semiconductor devices such as a processor, it is commonly practiced that multiple processor elements are installed, a data processing is performed by the multiple processor elements in parallel, and thereby processing performance is improved. Especially, a processor for performing an operation by a single operation instruction on the multiple data among processors having the multiple processor elements is called an SIMD (Single Instruction Multi Data) type processor. Since such an SIMD type processor can perform arithmetic operations at high speed by being used for an image processing in which the same operation is performed on multiple pieces of pixel data, it is useful.

Examples of such a processor are disclosed in Japanese Unexamined Patent Publication No. Hei4 (1992)-295953, Japanese Unexamined Patent Publication No. 2009-123074, Japanese Unexamined Patent Publication No. 2007-73010, and "An integrated memory array processor architecture for embedded image recognition systems", ISCA2005, kyo. S. In Japanese Unexamined Patent Publication No. Hei4 (1992)-295953, Japanese Unexamined Patent Publication No. 2009-123074, Japanese Unexamined Patent Publication No. 2007-73010, and "An integrated memory array processor architecture for embedded image recognition systems", ISCA2005, kyo. S, the multiple processor elements perform a parallel data processing. At this time, in Japanese Unexamined Patent Publication No. Hei4 (1992)-295953, Japanese Unexamined Patent Publication No. 2009-123074, Japanese Unexamined Patent Publication No. 2007-73010, and "An integrated memory array processor architecture for embedded image recognition systems", ISCA2005, kyo. S, devices (or processors) each have a data transfer network through which data transfer is performed among the processor elements. Moreover, Japanese Unexamined Patent Publication No. Hei4 (1992)-295953, Japanese Unexamined Patent Publication No. 2009-123074, Japanese Unexamined Patent Publication No. 2007-73010, and "An integrated memory array processor architecture for embedded image recognition systems", ISCA2005, kyo. S can each improve a speed of the data transfer between the processor elements by having the data transfer network. In the image processing, there are many processings each of which needs to transfer image information between the processor elements in a movement processing of an image in vertical direction and horizontal direction, a rotation processing of an image, a filter processing, etc., and therefore an effect of improvement in throughput achieved by having the data transfer network is large.

SUMMARY

In Japanese Unexamined Patent Publication No. Hei4 (1992)-295953, Japanese Unexamined Patent Publication No. 2009-123074, Japanese Unexamined Patent Publication No. 2007-73010, and "An integrated memory array processor architecture for embedded image recognition systems", ISCA2005, kyo. S, a throughput of a processor is restricted by a transfer capability of a data transfer network. Here, in order to improve the throughput of the data transfer network, it is necessary to better a circuit configuration, such as increasing the number of pieces of wiring for connecting between processor elements, increasing the number of selectors, etc. However, there is a problem that the throughput of the data transfer network cannot be fully improved when betterment of the circuit configuration as described above cannot be fully carried out because of a restriction of a layout and a restriction of a circuit area.

According to one aspect of the present invention, the semiconductor device includes multiple processor elements each of which divides data that is contiguous in one direction among the multiple data defined as matrix data into multiple data groups for processing; a processor element control unit that issues a data shift instruction to the multiple processor elements, and a data transfer network that performs data transfer between the processor elements that adjoin each other in a data shift direction indicated by the data shift instruction, in which the multiple processor elements each have a data storage unit that stores one of the multiple data groups in an area defined by one word line address and that inputs/outputs the data collectively in units of the word line address; a data selector that selects either of the data located at a head bit line address in the data group or the data located at an end bit line address according to the data shift instruction and that outputs the selected data into the data transfer network as transfer data; a data shifter that shifts the bit line address at which the data group is stored to the right or to the left according to the data shift instruction for the data group stored at one word line address; and a data connector that connects the data group shifted by the data shifter and the transfer data obtained through the data transfer network and that stores the connected data in the data storage unit.

According to another aspect of the present invention the semiconductor device includes multiple processor elements each of which divides data that is contiguous in one direction among the multiple data defined as the matrix data into multiple data groups for processing; a processor element control unit that issues a data shift instruction to the multiple processor elements, and a data transfer network that performs data transfer between the processor elements which adjoin each other in the data shift direction indicated by the data shift instruction, in which the multiple processor elements each select one of the multiple data groups in one cycle, select either of head data of the selected data group or end data thereof according to the data shift instruction, output the selected data into the data transfer network as transfer data, perform a data shift processing of shifting the bit line address at which the data group is stored to the right or to the left according to the data shift instruction on the selected data group, connect the data group subjected to the data shift processing and the transfer data obtained through the data transfer network, and store the connected data in the data storage unit in its own processor element.

In the semiconductor device according to the present invention, when the data shift processing is performed on the data group that each processor element has, data at the end of the data group is selected as the transfer data according to the shift direction, and the transfer data is transferred to its adjacent processor through the data transfer network. Moreover, the semiconductor device according to the present invention connects the transfer data given from an adjacent processor element and a data group obtained by excluding the transfer data from the data group that its own processor element holds to generate a new data group, and holds the new data group. Thereby, in the semiconductor device according to the present invention, it is possible to increase the throughput including a data transfer capability between the processor elements without complicating the data transfer network.

With the semiconductor device according to the aspects of the present invention, the throughput of the semiconductor device that has the multiple processor elements can be improved.

DETAILED DESCRIPTION

First Embodiment

Figure 1:
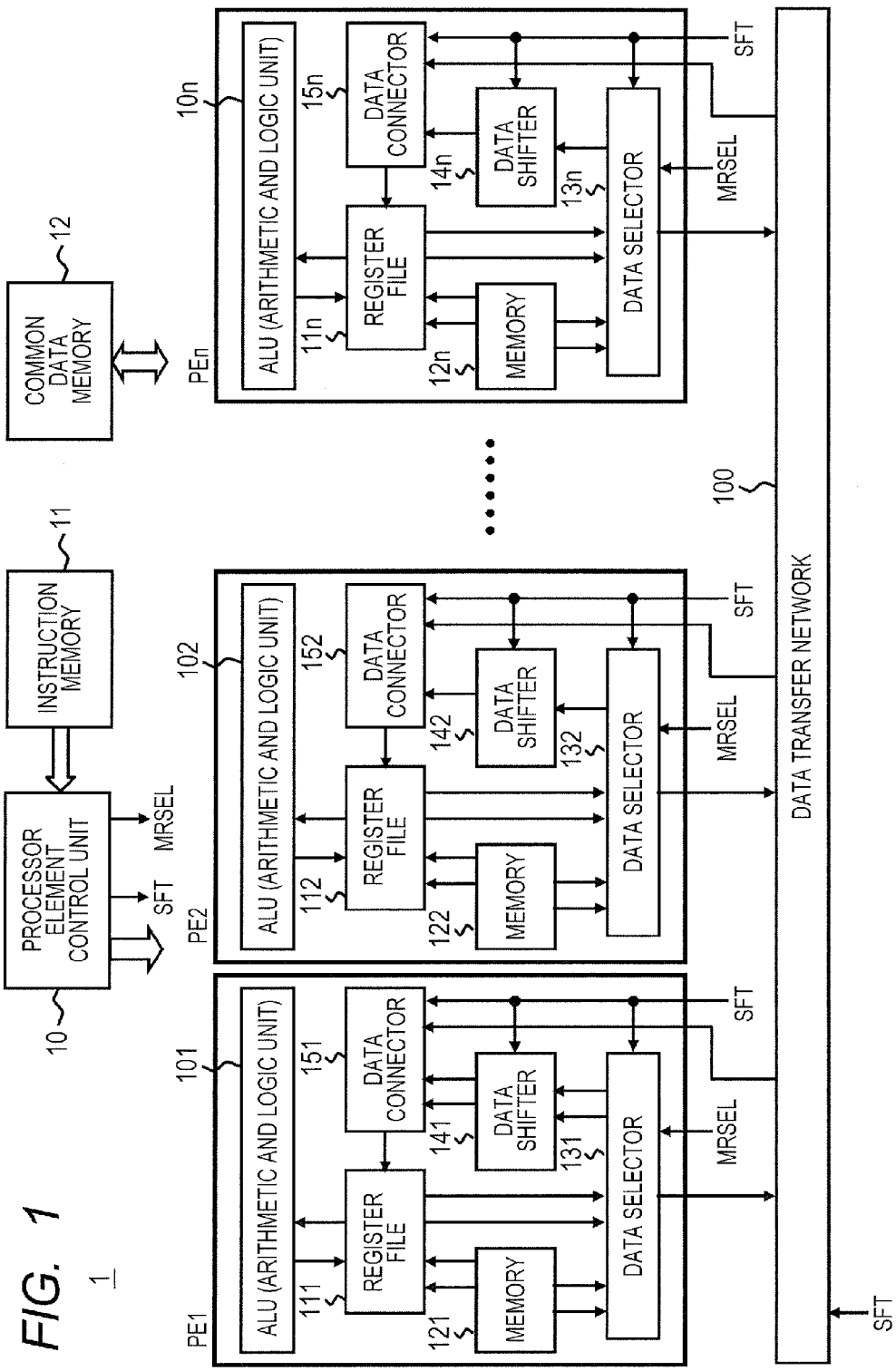
FIG. 1 is a block diagram of a semiconductor device according to a first embodiment.

Hereinafter, the present invention will be explained referring to drawings. FIG. 1 shows a block diagram of a semiconductor device 1 according to a first embodiment of the present invention. As shown in FIG. 1, the semiconductor device 1 has a processor element control unit 10, instruction memory 11, common data memory 12, multiple processor elements (e.g., processor elements PE1 to PEn, where n is an integer indicating the number of processor elements, and will be used similarly in the following), and a data transfer network 100. Incidentally, although FIG. 1 shows only a processor core greatly concerned with the present invention in the semiconductor device 1, the semiconductor device 1 has other circuits than blocks shown in FIG. 1.

In the present invention, data that is contiguous in one direction among the multiple data defined as matrix data is divided into multiple data groups, and the data groups after the division are processed using multiple processor elements, respectively. The present invention has one of features in a processing method at the time of the data shift processing of shifting the data that is contiguous in a column direction in the matrix data to the right or to the left.

The processor element control unit 10 has a function as an instruction decoder. Moreover, an instruction code to be decoded by the processor element control unit 10 is stored in the instruction memory 11. This instruction code is read by an unillustrated fetching circuit, etc. from second cache memory, main memory, etc. that are not illustrated. If the instruction code read from the instruction memory 11 is a data shift operation instruction code, the processor element control unit 10 will issue a data shift instruction (SFT) to the processor elements PE1 to PEn. Moreover, if the instruction code read from the instruction memory 11 is an instruction code other than the data shift operation instruction code, the processor element control unit 10 will issue an operation instruction according to the read instruction code to the processor elements PE1 to PEn.

The data processed by the processor elements PE1 to PEn are stored in the common data memory 12. The processor elements PE1 to PEn each read the data that should be processed from the common data memory 12. Moreover, the processor elements PE1 to PEn each write back the data after the processing in the common data memory 12.

The processor elements PE1 to PEn each divide the data that is contiguous in one direction among the multiple data defined as the matrix data into the multiple data groups and process them. Especially, when the instruction issued by the processor element control unit 10 is the data shift instruction (SFT), the processor elements PE1 to PEn each output the data to be passed to an adjacent processor element, and at the same time store data transferred from another adjacent processor element being included in the data group that its own processor element holds. The data transfer network 100 performs the data transfer between the processor elements that adjoin each other in a data shift direction indicated by the data shift instruction (SFT).

Here, the processor elements PE1 to PEn will be explained in detail. As shown in FIG. 1, the processor elements PE1 to PEn each have an arithmetic logical unit, a register file, memory, a data selector, a data connector, and a data shifter, respectively. In the example shown in FIG. 1, while a classification of the block is indicated by upper two digits of a code given to each block in the processor element, and at the same time a number of the processor element is indicated by lower one digit. Since the processor elements PE1 to PEn are of the same structure, respectively, in the below, the processor element PE1 will be explained as a good example of the processor elements.

The processor element PE1 has an arithmetic and logic unit (ALU) 101, a register file 111, memory 121, a data selector 131, a data shifter 141, and a data connector 151. Incidentally, although the register file 111 and the memory 121 were shown in FIG. 1 as of a data storage unit in the processor element, these can also be formed as one circuit block.

The ALU 101 performs an arithmetic operation on the data group stored in the data storage unit of its own processor element in response to the operation instruction that the processor element issued. In this embodiment, the ALU 101 performs the arithmetic operation on the data group loaded from the memory 121 to the register file 111.

The data storage unit is comprised of the register file 111 and the memory 121. The register file 111 and the memory 121 each store one of the multiple data groups in an area defined by one word line address, and input/output the data group collectively. Incidentally, the register file 111 and the memory 121 each store one piece of data to one bit line address. Then, one piece of data in the data group is specified by the word line address and the bit line address. Details of the register file 111 and the memory 121 will be described later.

The data selector 131 selects either of the data located at the head bit line address in the data group stored in the register file 111 or the memory 121 and the data located at an end bit line address in the data group according to the data shift instruction (SFT), and outputs the selected data into the data transfer network 100 as the transfer data. Details of this data selector 131 will be described later.

The data shifter 141 shifts the bit line address at which the data group is stored to the right or to the left according to the data shift instruction for the data group stored at one word line address. Details of the data shifter 141 will be described later.

The data connector 151 connects the data group shifted by the data shifter and the transfer data obtained through the data transfer network, and stores it in the data storage unit. That is, the data group that the data connector 151 outputs becomes the data group stored in the register file 111 or the memory 121 that is shifted to the right or to the left. Details of this data connector will be described later.

Here, details of the register file 111, the memory 121, the data selector 131, the data shifter 141, and the data connector 151 will be explained.

Figure 2:
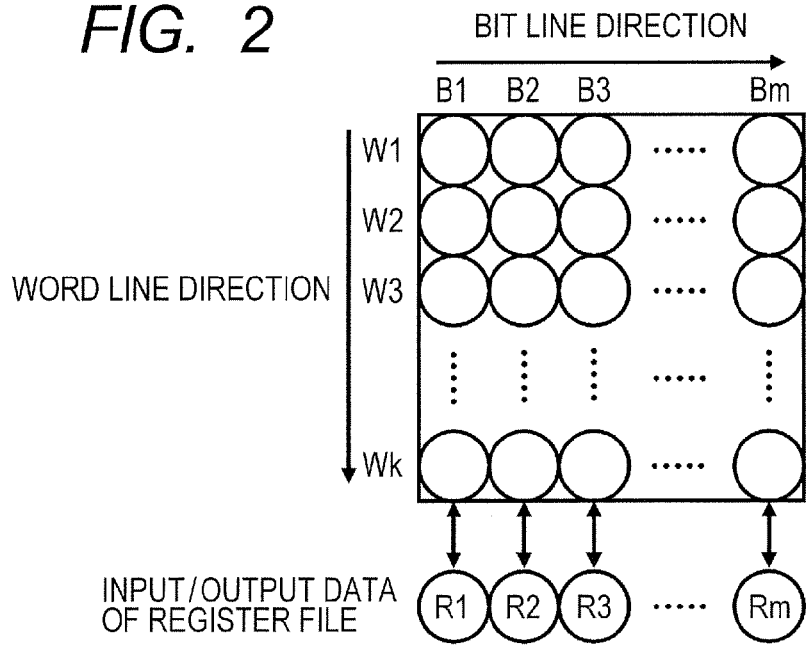
FIG. 2 is a schematic diagram of a register file according to the first embodiment.

FIG. 2 shows a schematic diagram of the register file 111. As shown in FIG. 2, the register file 111 has addresses in the bit line direction and in the word line direction, respectively. In an example shown in FIG. 2, it has addresses B1 to Bm (m is an integer indicating the number of bit line addresses) as the bit line addresses. Moreover, in the example shown in FIG. 2, it has the addresses W1 to Wk (k is an integer indicating the number of word line addresses) as the word line addresses. The register file 111 stores one data group in an area defined by one word line address. Moreover, the register file 111 performs reading and writing of the data group in units of a word line. In the example shown in FIG. 2, symbols of R1 to Rm were given to pieces of data of which the data group that the register file 111 outputs and inputs is comprised. Incidentally, specification of the word line address and specification of the bit line address are performed by the ALU 101 according to the operation instruction given from the processor element control unit 10. For example, when the operation instruction is an add instruction, the ALU 101 outputs the word line address and the bit line address corresponding to an area where the data to be added is stored. Moreover, when the operation instruction is the data shift instruction (SFT), the ALU 101 outputs the word line address at which the data group that is an object of the data shift processing is stored.

Figure 3:
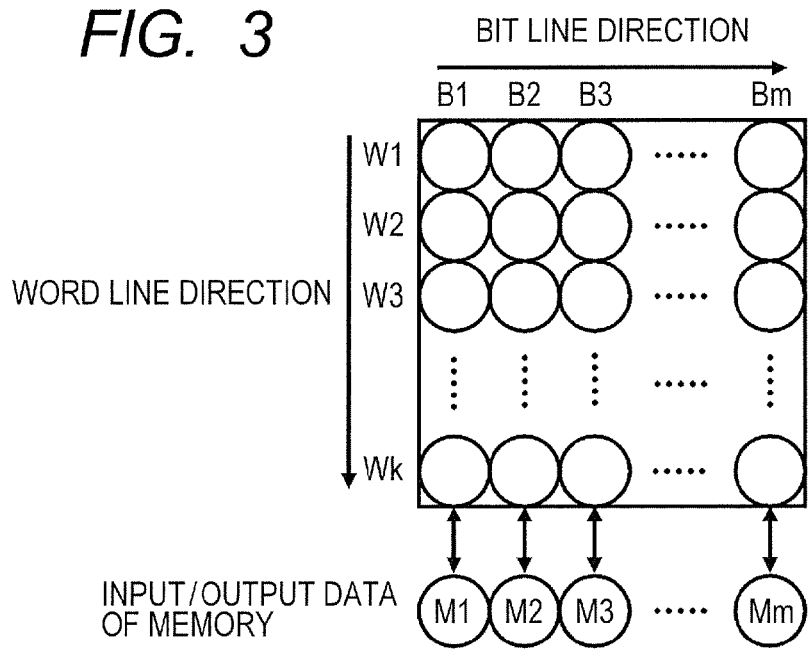
FIG. 3 is a schematic diagram of memory according to the first embodiment.

FIG. 3 shows a schematic diagram of the memory 121. As shown in FIG. 3, the memory 121 has addresses in the bit line direction and in the word line direction, respectively. In an example shown in FIG. 3, it has the addresses B1 to Bm as the bit line addresses. Moreover, in the example shown in FIG. 3, it has the addresses W1 to Wk as the word line addresses. The memory 121 stores one data group in the area defined by one word line address. Moreover, the memory 121 performs reading and writing of the data group in units of the word line. In the example shown in FIG. 3, symbols of M1 to Mm were given to pieces of data of which the data group that the memory 121 outputs and inputs is comprised. Incidentally, the ALU 101 performs specification of the word line address and specification of the bit line address according to the operation instruction given from the processor element control unit 10. For example, when the operation instruction is the add instruction, the ALU 101 outputs the word line address and the bit line address corresponding to an area in which the data to be added is stored. Moreover, when the operation instruction is the data shift instruction (SFT), the ALU 101 outputs the word line address at which the data group becoming an object of the data shift processing is stored.

Figure 4:
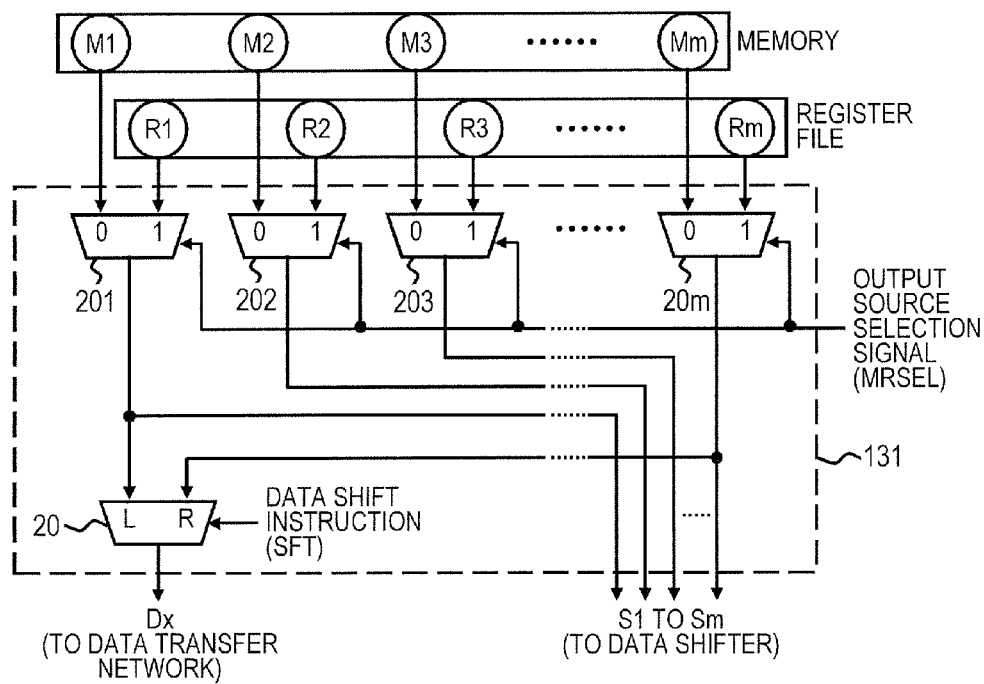
FIG. 4 is a block diagram of a data selector according to the first embodiment.

FIG. 4 shows a block diagram of the data selector 131. As shown in FIG. 4, the data selector 131 has selectors 201 to 20m and a selector 20. The selectors 201 to 20m select and output either of data R1 to Rm outputted from the register file 111 or the data M1 to Mm outputted from the memory 121 according to the output source selection signal (MRSEL), respectively. The data that these selectors 201 to 20m output are outputted to the data shifter 141 as data S0 to Sm, respectively. Incidentally, the output source selection signal (MRSEL) is outputted according to a result that the processor element control unit 10 decoded the instruction code. In an example shown in FIG. 4, when the output source selection signal (MRSEL) shows zero, the selectors 201 to 20m output data M1 to Mm outputted from the memory 121 as the data S0 to Sm, respectively. Moreover, when the output source selection signal (MRSEL) shows unity, the selectors 201 to 20m output the data R1 to Rm outputted from the register file 111 as the data S0 to Sm, respectively.

Figure 5:
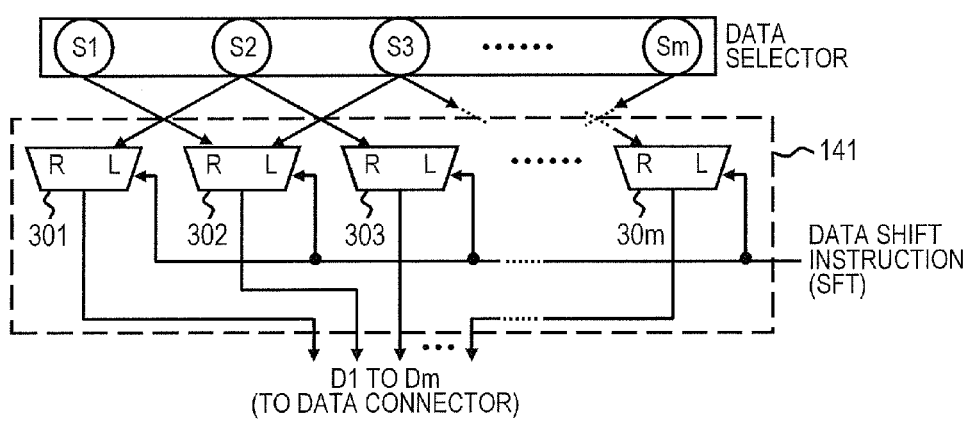
FIG. 5 is a block diagram of a data shifter according to the first embodiment.

Moreover, the selector 20 selects either of the data that a selector 201 outputs or the data that selector 20m outputs according to the data shift direction indicated by the data shift instruction (SFT), and outputs the selected data as transfer data Dx. Incidentally, the selector 201 is provided correspondingly to the data located at the head bit line address in the data group; the selector 20m is provided correspondingly to the data located at the end bit line address in the data group. That is, the selector 20 selects either of the data located at the head bit line address in the data group or the data located at the end bit line address in the data group according to the data shift instruction, and outputs the selected data into the data transfer network 100 as the transfer data Dx FIG. 5 shows a block diagram of the data shifter 141. As shown in FIG. 5, the data shifter 141 has selectors 301 to 30m. The selectors 301 to 30m are provided correspondingly to the bit line addresses B1 to Bm. The selectors 301 to 30m each select either of the data outputted from a bit line address obtained by shifting the bit line address to which its own selector corresponds to the right by one address or the data outputted from a bit line address obtained by shifting the bit line address to which its own selector corresponds to the left by one address, and output the selected data to the data connector 151.

More specifically, when the data shift instruction (SFT) indicates the right direction shift, the selectors 301 to 30m assume that data D1 corresponding to a bit line address B1 have no data, and output data S1 to Sm−1 as data D2 to Dm corresponding to bit line addresses B2 to Bm. On the other hand, when the data shift instruction (SFT) indicates a left direction shift, the selectors 301 to 30m output the data S2 to Sm as the data D1 to Dm−1 corresponding to the bit line addresses B1 to Bm−1, and assume that the data Dm corresponding to the bit line address Bm have no data.

Figure 6:
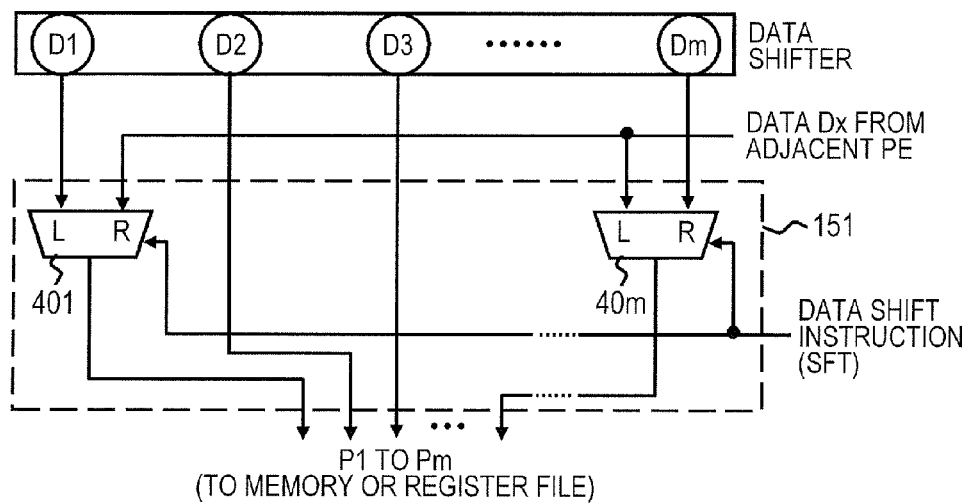
FIG. 6 is a block diagram of a data connector according to the first embodiment.

FIG. 6 shows a block diagram of the data connector 151. As shown in FIG. 6, the data connector 151 has selectors 401 to 40m. When the data shift instruction (SFT) specifies a right direction shift, the selector 401 outputs the data Dx obtained through the data transfer network as data P1. Moreover, when the data shift instruction (SFT) specifies the left direction shift, the selector 401 outputs the data D1 that the data shifter 141 outputted as the data P1. When the data shift instruction (SFT) specifies the right direction shift, the selector 40m outputs the data Dm that the data shifter 141 outputted as data Pm. Moreover, when the data shift instruction (SFT) specifies the left direction shift, the selector 401 outputs the data Dx obtained through the data transfer network as the data Pm. Moreover, the data connector 151 outputs the data D2 to Dm−1 that the data shifter 141 outputs as data P2 to Pm−1.

Figure 7:
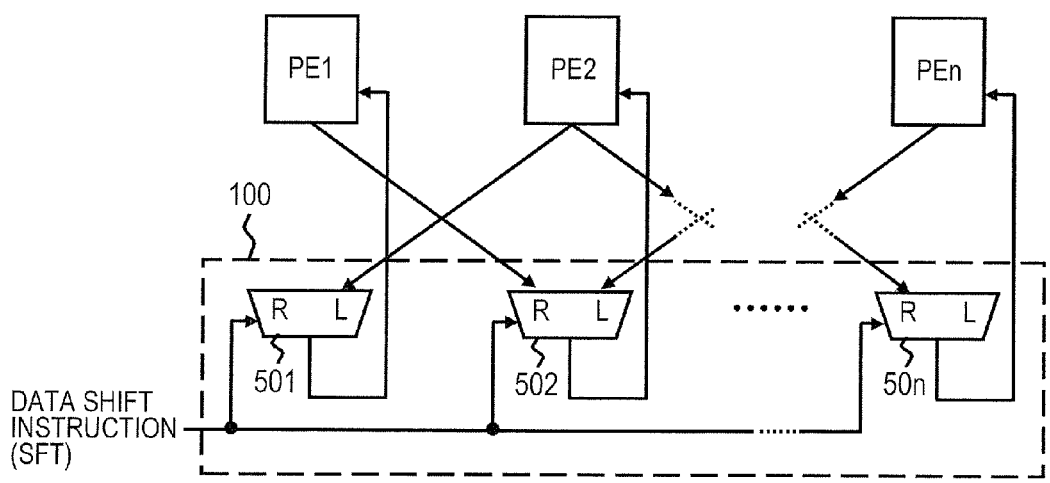
FIG. 7 is a block diagram of a data transfer network according to the first embodiment.

FIG. 7 shows a block diagram of the data transfer network 100. As shown in FIG. 7, the data transfer network 100 has selectors 501 to 50n. The selectors 501 to 50n are provided correspondingly to the processor elements PE1 to PEn, respectively, and the selectors each select the transfer data Dx outputted from the processor elements located on the both sides of the corresponding processor element, and they output it to the corresponding processor element. The selectors 501 to 50n each select the transfer data Dx outputted from the processor element located in the data shift direction indicated by the data shift instruction (SFT), and output it to a corresponding processor element.

For example, when the data shift direction indicated by the data shift instruction is the right direction, the selectors 502 to 50n select the transfer data Dx that the processor element PE1 to PEn−1 output, and transmit the selected data to the processor elements PE2 to PEn, respectively. Incidentally, when the data shift direction indicated by the data shift instruction is the right direction, since a selector 501 has no data to transmit, it gives a state of no data to the processor element PE1. Moreover, when the data shift direction indicated by the data shift instruction is the left direction, the selectors 501 to 50n−1 select the transfer data Dx that the processor elements PE2 to PEn output, and transmit the selected data to the processor element PE1 to PEn−1, respectively. Incidentally, when the data shift direction indicated by the data shift instruction is the left direction, since the selector 50n has no data to transmit, it gives the state of no data to the processor element PEn.

Next, an operation of the semiconductor device 1 according to the first embodiment will be explained. The semiconductor device 1 has one of the features in a processing of performing the data shift processing on the multiple data contiguous in the same direction (e.g., the column direction) in the matrix data. Thereupon, in the following explanation, the data shift processing of shifting the data to the right thereof will be explained as the operation of the semiconductor device 1. Moreover, in an operation example to be explained below, data of one row and 16 columns shall be handled using four processors.

Moreover, in the semiconductor device 1, each processor element is of the same circuit configuration and it performs the same operation in the data shift processing. Thereupon, in the following explanation, operations of the processor elements PE1 to PE4 will be explained using a block diagram of the processor element PE1.

Figure 8:
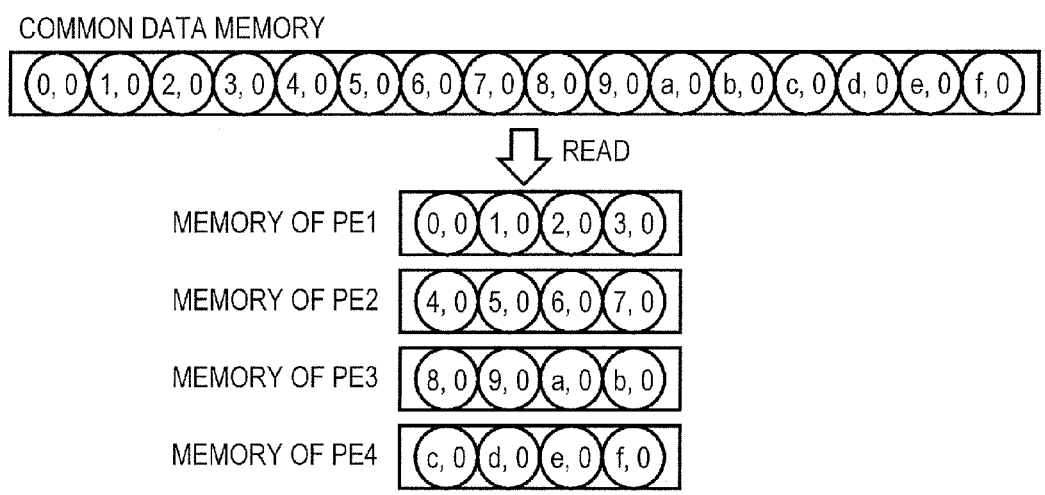
FIG. 8 is a diagram for explaining a read operation of a data group into memory of the semiconductor device according to the first embodiment.

In the semiconductor device 1 according to the first embodiment, before a specific processing is performed in the processor element, data is read from the common data memory 12 into memories 121 to 124 of the respective processor elements PE1 to PE4. Thereupon, FIG. 8 shows a diagram for explaining a read operation of the data group into the memories 121 to 124 of the semiconductor device 1 according to the first embodiment. In an example shown in FIG. 8, the data to be processed is data [0, 0] to [f, 0] belonging to a 0th row in certain matrix data. Let it be considered that these data [0, 0] to [f, 0] are stored in an area specified by one word line address of the common data memory 12. In the semiconductor device 1, the data [0, 0] to [3, 0] are stored in the memory 121 of the processor element PE1, the data [4, 0] to [7, 0] are stored in the memory 122 of the processor element PE2, the data [8, 0] to [b, 0] are stored in the memory 123 of the processor element PE3, and the data [c, 0] to [f, 0] are stored in the memory 124 of the processor element PE4. That is, in the example shown in FIG. 8, four pieces of data stored in the memory of each processor element correspond to the data group that shows a transaction in the processor element, respectively.

Figure 9:
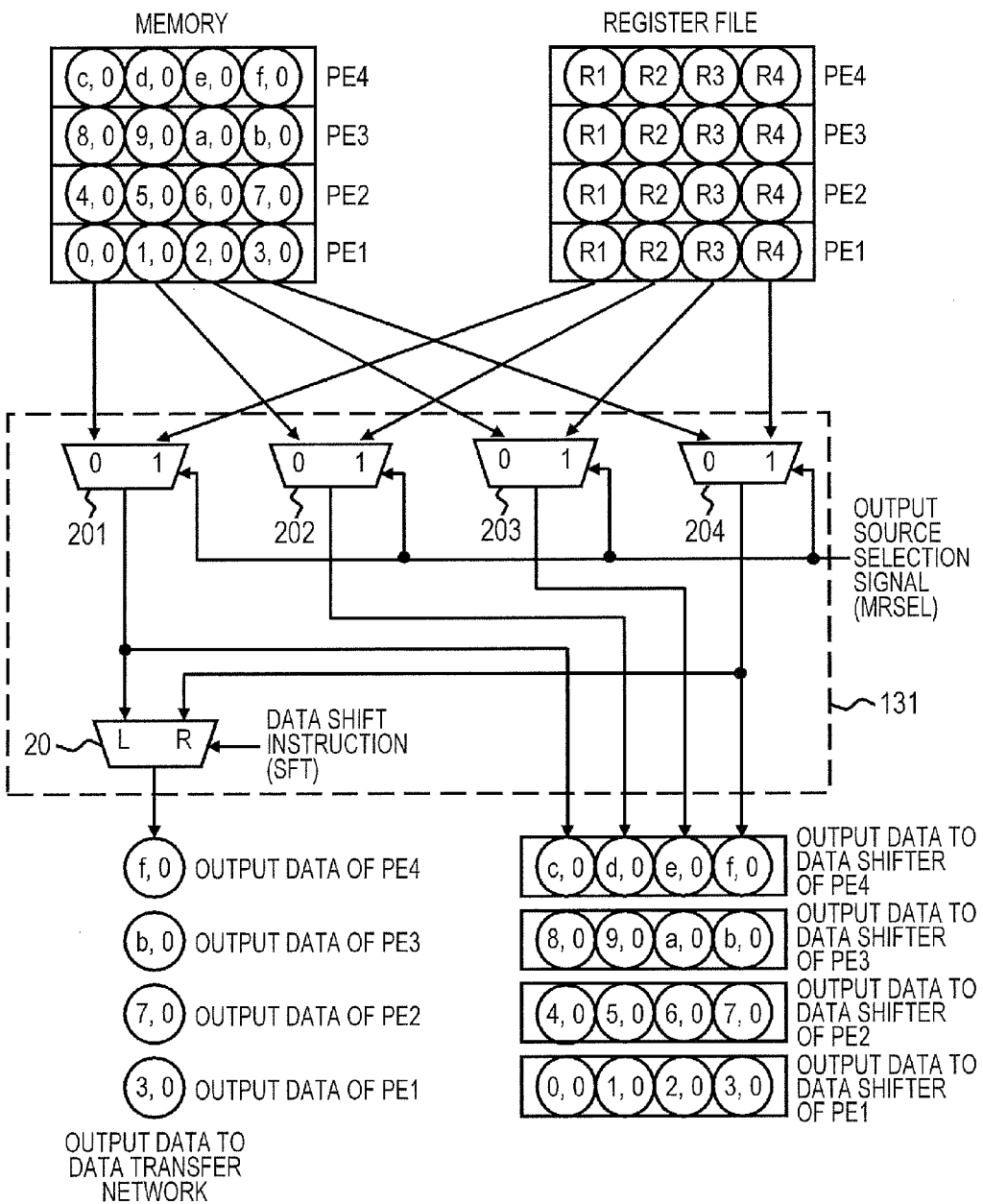
FIG. 9 is a diagram for explaining an operation of the data selector of the semiconductor device according to the first embodiment.

Next, execution of the data shift instruction (SFT) on the data group read from the common data memory 12 in FIG. 8 will be explained. First, operations of the data selector 131 to 134 in response to the data shift instruction (SFT) will be explained. FIG. 9 shows a diagram for explaining an operation of the data selector in the semiconductor device 1. In an example shown in FIG. 9, the selectors 201 to 204 each select the data outputted from the memory 121 according to zero being inputted therein as the output source selection signal (MRSEL). In the example shown in FIG. 9, the data [0, 0] to [3, 0] are given to the data shifter from the data selector in the processor element PE1, the data [4, 0] to [7, 0] are given to the data shifter from the data selector in the processor element PE2, the data [8, 0] to [b, 0] are given to the data shifter from the data selector in the processor element PE3, and the data [c, 0] to [f, 0] are given to the data shifter from the data selector in the processor element PE4.

Moreover, in the operation example, since the data shift instruction indicates the right direction as the data shift direction, the selector 20 outputs the data located at the end bit line address in the data group as the transfer data Dx. In the example shown in FIG. 9, the processor element PE1 outputs the data [3, 0] as the transfer data Dx, the processor element PE2 outputs the data [7, 0] as the transfer data Dx, the processor element PE3 outputs the data [b, 0] as the transfer data Dx, and the processor element PE4 outputs the data [f, 0] as the transfer data Dx.

Figure 10:
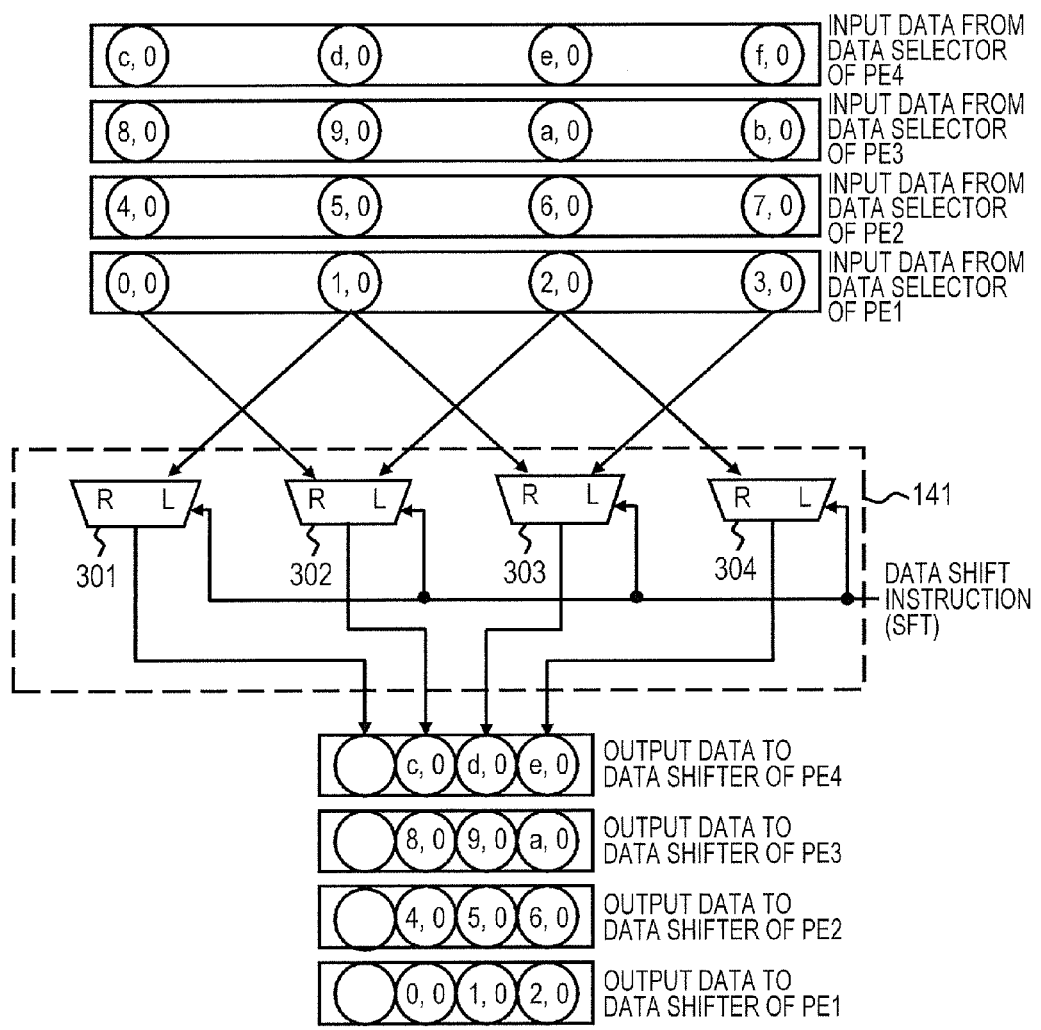
FIG. 10 is a diagram for explaining an operation of the data shifter of the semiconductor device according to the first embodiment.

Next, an operation of the data shifter will be explained. FIG. 10 shows a diagram for explaining the operation of the data shifter of the semiconductor device 1 according to the first embodiment. In the operation example, since the data shift instruction indicates the right direction as the data shift direction, the multiple selectors each shift the data group so that the bit line address corresponding to the data that is inputted may be incremented by one, respectively. Thereby, the processor element PE1 outputs the data [0, 0] to [2, 0] as the data D2 to D4, the processor element PE2 outputs the data [4, 0] to [6, 0] as the data D2 to D4, the processor element PE3 outputs the data [8, 0] to [a, 0] as the data D2 to D4, and the processor element PE4 outputs the data [c, 0] to [e, 0] as the data D2 to D4. Moreover, the processor elements PE1 to PE4 output the state of no data as the data D1, respectively.

Figure 11:
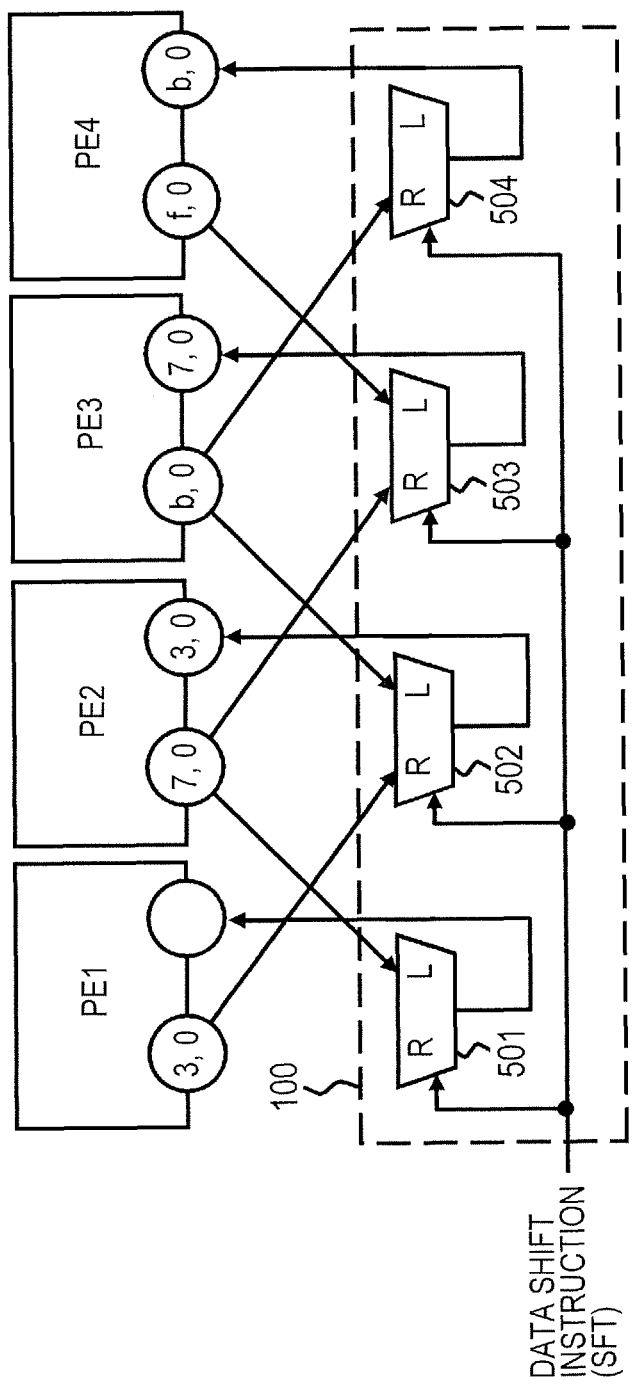
FIG. 11 is a diagram for explaining an operation of the data transfer network of the semiconductor device according to the first embodiment.

Next, an operation of the data transfer network 100 will be explained. FIG. 11 shows a diagram for explaining the operation of the data transfer network 100 of the semiconductor device 1 according to the first embodiment. As shown in FIG. 11, since the data shift instruction indicates the right direction as the data shift direction in this operation example, selectors 501 to 504 each select the transfer data Dx outputted by the processor element PE located on the right-hand side of the processor element that is an output destination of its own selector. Then, the selectors 501 to 504 each output the transfer data that the each selected to the processor element corresponding to its own selector.

In an example shown in FIG. 11, the data [3, 0] outputted by the processor element PE1 is transferred to the processor element PE2, the data [7, 0] outputted by the processor element PE2 is transferred to the processor element PE3, and the data [b, 0] outputted by the processor element PE3 is transferred to the processor element PE4. Incidentally, since the processor element PE1 has an alignment sequence that becomes on the right-most side within the processor elements, it has no data to be transferred. Therefore, the data transfer network 100 gives the state of no data to the processor element PE1.

Figure 12:
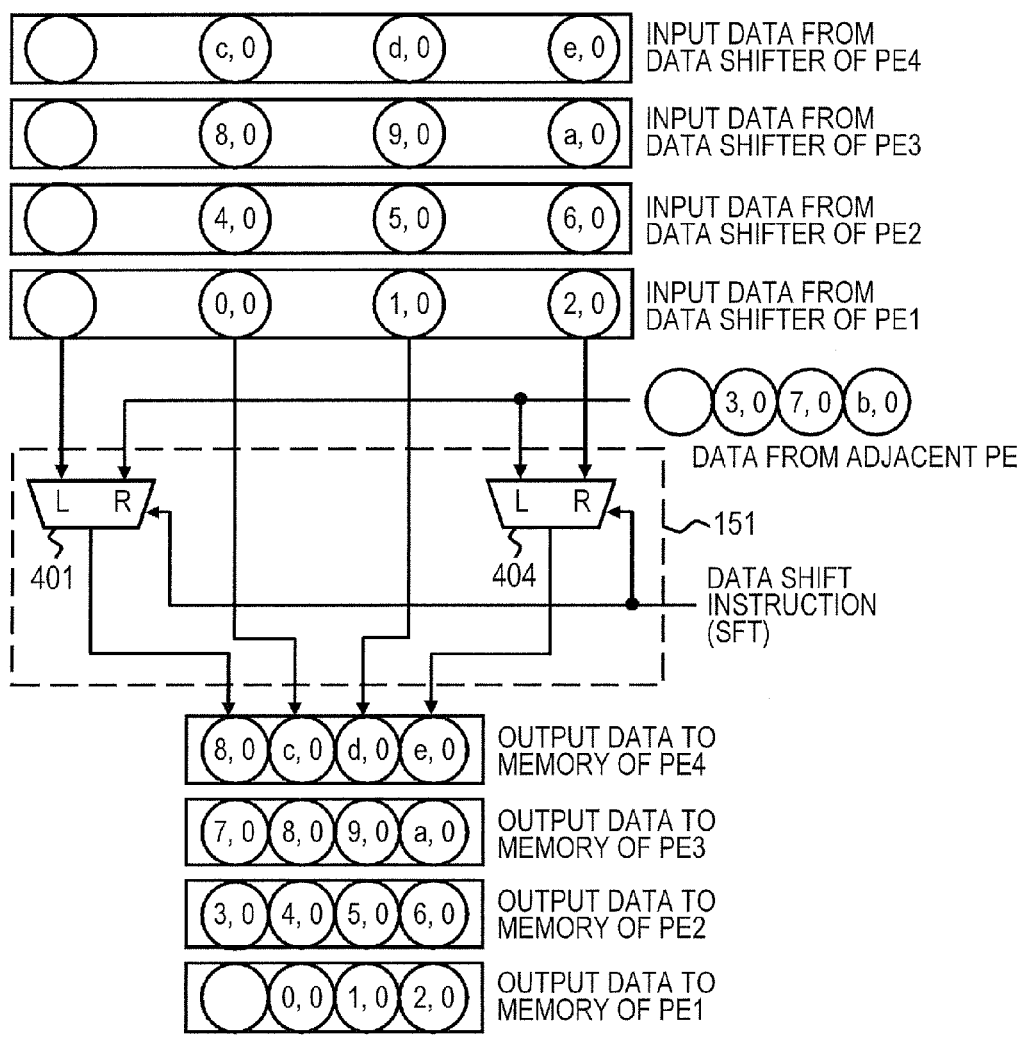
FIG. 12 is a diagram for explaining the operation of the data shifter of the semiconductor device according to the first embodiment.

Next, an operation of the data connector will be explained. FIG. 12 shows a diagram for explaining the operation of the data connector of the semiconductor device 1 according to the first embodiment. As shown in FIG. 12, in this operation example, since the data shift instruction indicates the right direction as the data shift direction, the selector outputs the data inputted into the input terminal on which a symbol of R is shown. That is, the selector 401 outputs the data outputted from the adjacent processor elements. On the other hand, the selector 404 outputs data D4 that the data shifter outputs.

Thereby, the data connector of the processor element PE1 outputs the state of no data to the memory 121 as the data P1, and outputs the data [0, 0] to [2, 0] as the data P2 to P4. Moreover, the data connector of the processor element PE2 outputs the data [3, 0] to [6, 0] to the memory 122 as data P1 to P4, the data connector of the processor element PE3 outputs the data [7, 0] to [a, 0] to the memory 123 as the data P1 to P4, and the data connector of the processor element PE4 outputs the data [8, 0] to [e, 0] to the memory 124 as the data P1 to P4.

Figure 13:
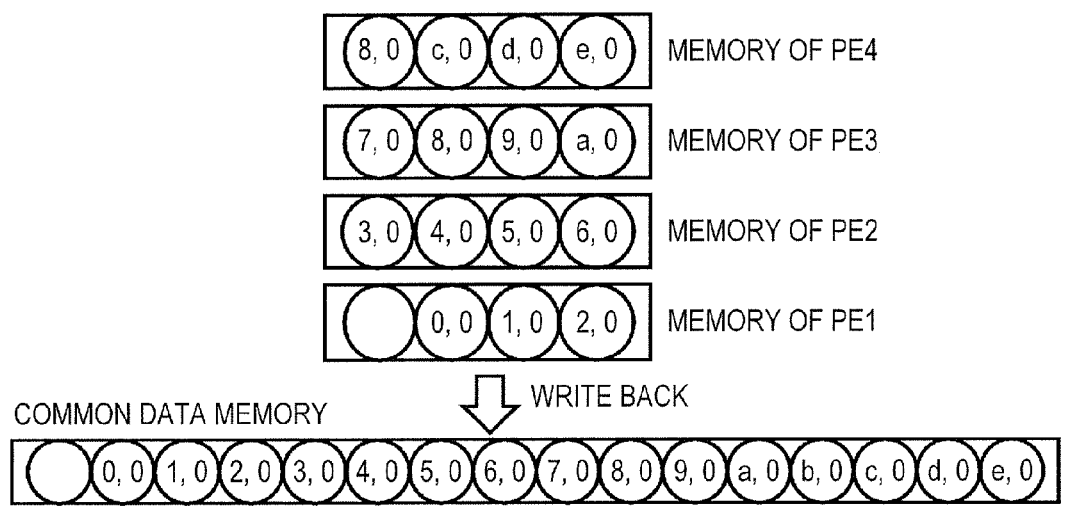
FIG. 13 is a diagram for explaining a write operation of the data group into common data memory from the memory of the semiconductor device according to the first embodiment.

Next, in the semiconductor device 1 according to the first embodiment, the data group that is subjected to the data shift processing using the processor elements PE1 to PE4 is written back to the common data memory 12. Thereupon, FIG. 13 shows a diagram for explaining a data group write operation into the common data memory 12 from the memory of the processor element. As shown in FIG. 13, the data after the writing-back becomes the data before the data shift processing that is shifted to the right by one address.

From the above-mentioned explanation, the semiconductor device 1 according to the first embodiment has a data selector that extracts the transfer data to be transferred to the processor element which adjoins a data transfer path in the processor element, a data shifter that shifts a storing position of the data within the processor element, a data connector that connects the transfer data obtained from the adjacent processor element through the data transfer network and the data group that was subjected to the data shift processing in the data shifter, and a data transfer network that transmits the transfer data between the adjacent processor elements.

That is, the semiconductor device 1 according to the first embodiment has the processor elements PE1 to PEn each of which divides the data that is contiguous in one direction among the multiple data defined as the matrix data into the multiple data groups and processes them, the processor element control unit 10 for issuing the data shift instruction (SFT) to the processor elements PE1 to PEn, and the data transfer network 100 for performing the data transfer between the processor elements that adjoin each other in the data shift direction indicated by the data shift instruction (SFT). The processor elements PE1 to PEn each select one of the multiple data groups in one cycle, select either of the head data of the selected data group or the end data thereof according to the data shift instruction (SFT), output the selected data into the data transfer network 100 as the transfer data, perform the data shift processing of shifting the bit line address at which the data group is stored to the right or to the left according to the data shift instruction (SFT) on the selected data group, connect the data group subjected to the data shift processing and the transfer data obtained through the data transfer network, and store it in the data storage unit in its own processor element, respectively.

Thereby, the semiconductor device according to the first embodiment can perform the data shift processing of the data group belonging to the same row at high speed without performing a complicated arithmetic operation even if having a data group comprised of the multiple data. Moreover, the processor element according to the first embodiment can perform the data shift processing in one cycle by configuring the data selector, the data shifter, the data connector, and the data transfer network with the selectors operating asynchronously.

On the other hand, in the prior art semiconductor device, in the case where the processor element has a data group comprised of multiple data, when the data shift processing over the processor elements is performed, a complicated operation becomes necessary. For example, when one processor element holds the data group comprised of four pieces of data and performs the data shift processing between the adjacent processor elements, a processing of five cycles is needed. More specifically, the following cycles become necessary: a first cycle of storing first data to be handed to the adjacent processor elements among pieces of data of the data group that will be processed by the data shift processing; a second cycle of moving second data adjacent to the first data to an area where the first data was stored; a third cycle of moving third data adjacent to the second data to an area where the second data was stored; a fourth cycle of moving fourth data adjacent to the third data to an area where the third data was stored; and a fifth cycle of storing the first data obtained from the adjacent processor element in the area where the fourth data was stored. Thus, in the prior art semiconductor device, the more the number of pieces of the data of which the data group being held in the processor element is comprised, the more the number of cycles becomes necessary. On the other hand, in the semiconductor device according to the first embodiment, since the data shift processing can be completed in one cycle irrespective of the number of pieces of data of which the data group is comprised, an effect of increase in speed becomes so large as the number of pieces of data of which the data group is comprised increases.

Such a data shift processing is a processing used heavily very much when determining coincidence or non-coincidence of two images taken, for example, at different timings or different angles. By performing coincidence/non-coincidence determination of different images taken in this way, a change in a photographed object can be detected. Therefore, by performing the data shift processing at high speed, it becomes possible to detect the change in the photographed object at higher speed.

Moreover, in the semiconductor device 1 according to the first embodiment, high-speed data transfer is realizable while simplifying a configuration of the data transfer network 100 very much, In an example shown in Japanese Unexamined Patent Publication No. 2007-73010 or "An integrated memory array processor architecture for embedded image recognition systems", ISCA2005, kyo. S, a selector in a data transfer network has two or more inputs, and wiring is more complicated than that of the data transfer network according to the first embodiment. On the other hand, in the data transfer network 100 according to the first embodiment, the selector has a configuration of two inputs and one output, and the number of wiring about the selector is small. Thus, a chip area of the semiconductor device 1 is reducible by configuring the data transfer network 100 with a small number of wiring.

Moreover, in the semiconductor device according to the first embodiment, a data group comprised of the multiple data is given as data that a single processor element processes. Thus, by having the multiple data in one processor element, it is possible to reduce the number of times of data transfer through the data transfer network 100, and to enhance a throughput of the semiconductor device 1. For example, when performing a filtering processing by giving one piece of data to one processor element, the number of times of data transfer increases in proportion to a size of a filtering range. More specifically, when computing an average of an image of 5×5 pixels, each of the multiple processor elements computes an addition result of the data of the five pixels in the row direction. It is necessary to acquire addition results from two processor elements on the left-hand side, respectively, to acquire addition results from two processor elements on the right-hand side, respectively, and after this, to add the acquired addition results and an addition result computed by its own processor element. On the other hand, according to the processor element according to the first embodiment, the addition result of the 5×5 pixels can be computed by computing an addition result of the 5×4 pixels in one processor element and obtaining an addition result of the remaining one column from the adjacent processor element.

Second Embodiment

Figure 14:
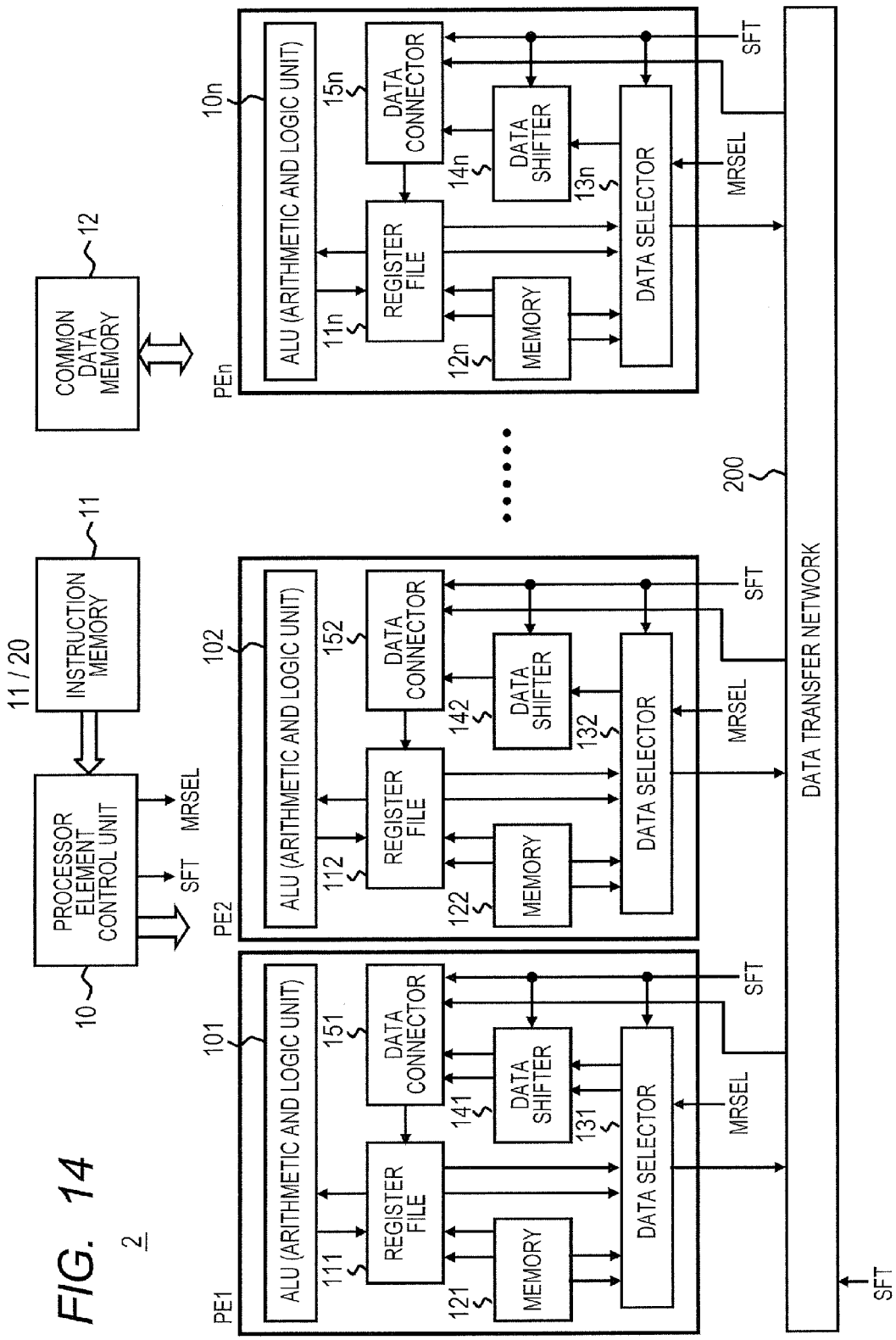
FIG. 14 is a block diagram of a semiconductor device according to a second embodiment.

FIG. 14 shows a block diagram of a semiconductor device 2 according to a second embodiment. As shown in FIG. 14, the semiconductor device 2 is has a data transfer network 200 in place of the data transfer network 100 of the semiconductor device 1 according to the first embodiment. The data transfer network 200 shows another mode of the data transfer network 100.

The data transfer network 200 performs the data transfer between the adjacent processor elements. At this time, when the data transfer is performed between the head processor element (e.g., the processor element PE1) located in one end part (e.g., the left end) among the multiple processor elements and the end processor element (e.g., the processor element PEn) located in the other end part (e.g., the right end) thereamong, the data transfer network 200 performs the data transfer spanning processing cycles.

Figure 15:
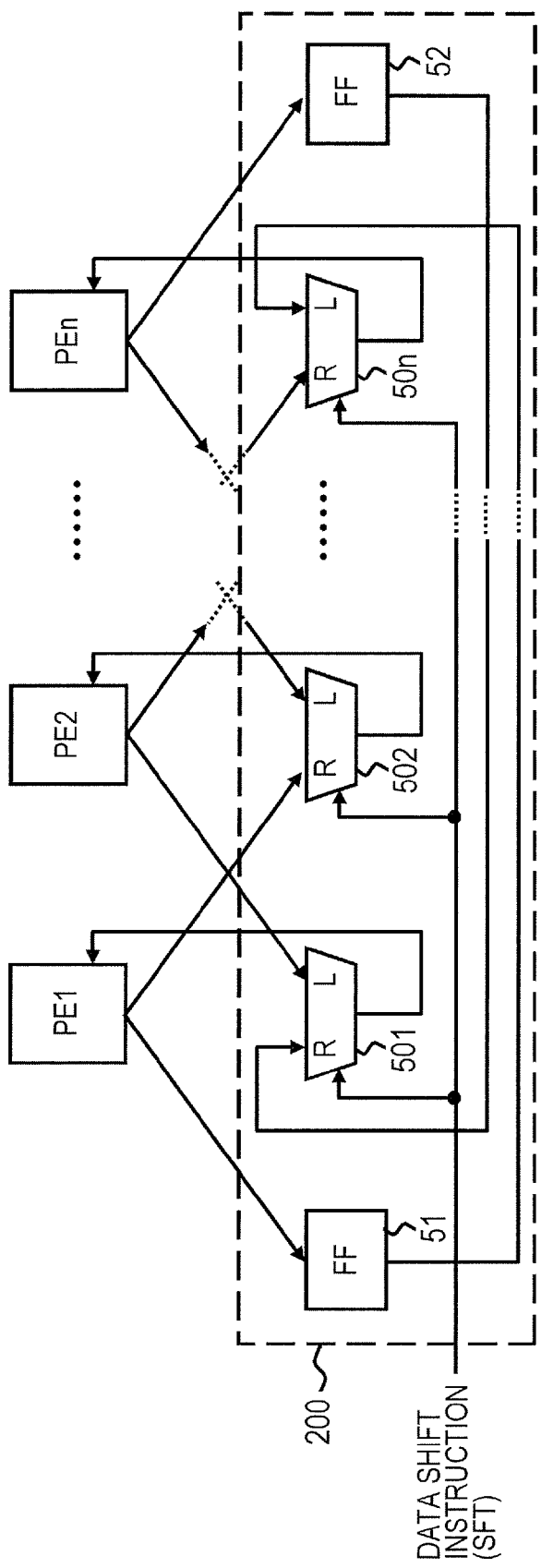
FIG. 15 is a block diagram of a data transfer network according to the second embodiment.

Here, FIG. 15 shows a block diagram of the data transfer network 200. As shown in FIG. 15, the data transfer network 200 has the selectors 501 to 50*n*, a first temporary holding unit (e.g., a flip-flop 51), and a second temporary holding unit (e.g., a flip-flop 52). The selectors 502 to 50*n*−1 are provided correspondingly to the processor elements PE2 to PEn−1, respectively, and each output the transfer data outputted from the processor elements located on the both sides of the corresponding processor element to the corresponding processor element. Moreover, the selectors 502 to 50*n*−1 each select the transfer data outputted from the processor element located in the data shift direction indicated by the data shift instruction, and output it to the corresponding processor element.

The flip-flop 51 holds the transfer data outputted by the processor element PE1 located at one end part among the processor elements PE1 to PEn. The flip-flop 52 holds the transfer data outputted by the processor element PEn located at the other end part among the multiple processor elements.

The selector 501 corresponds to the head selector provided correspondingly to the processor element PE1. Then, the selector 501 selects and outputs either of the transfer data that the flip-flop 52 holds or an output from the processor element PE2 located on the right-hand side of the processor element PE1 according to the data shift instruction.

The selector 50*n* corresponds to the end selector provided correspondingly to the processor element PEn. The selector 50*n* selects and outputs either of the transfer data that the flip-flop 51 holds or an output from the processor element PEn−1 located on the left-hand side of the processor element PEn according to the data shift instruction.

Thus, the data transfer network 200 can transfer the data that one of the processor elements located at both end parts outputs in a current cycle to the other of the processor elements located at the both end parts in the next cycle by performing the data transfer between the processor elements located at the both end parts through the flip-flops. By performing this processing, the data shift processing performed astride the data groups belonging to different rows of the matrix data becomes possible, for example.

Next, an operation of the semiconductor device 2 according to the second embodiment will be explained. The semiconductor device 2 according to the second embodiment has one of features when the data shift processing is performed between the data groups belonging to different rows. Thereupon, in the following explanation, an explanation of an example where when 48 pieces of data represented by one row are divided into matrix data of three rows and 16 columns and are held, the 48 pieces of data is subjected to the data shift processing to the right is given.

Figure 16:
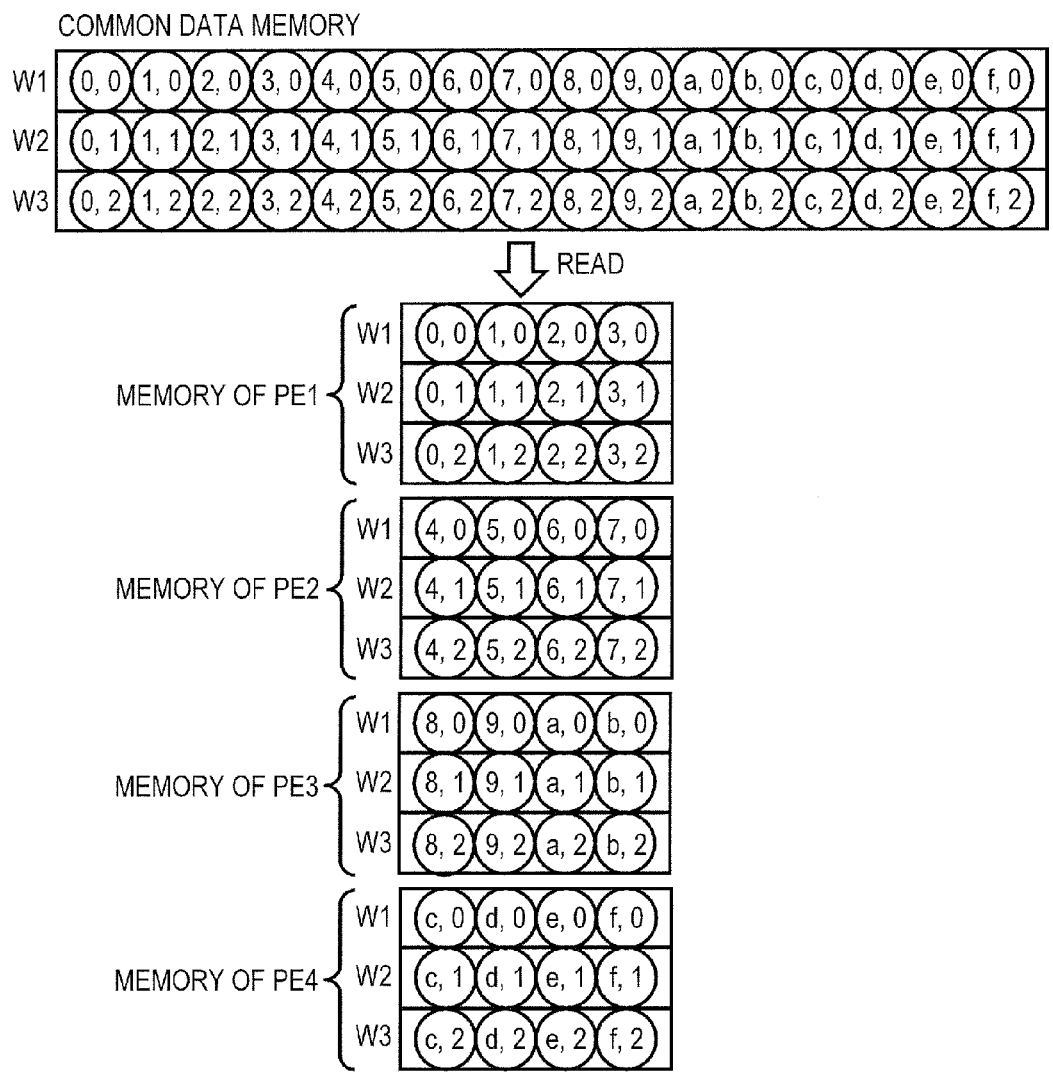
FIG. 16 is a diagram for explaining the read operation of the data group into memory of the semiconductor device according to the second embodiment.
Figure 17:
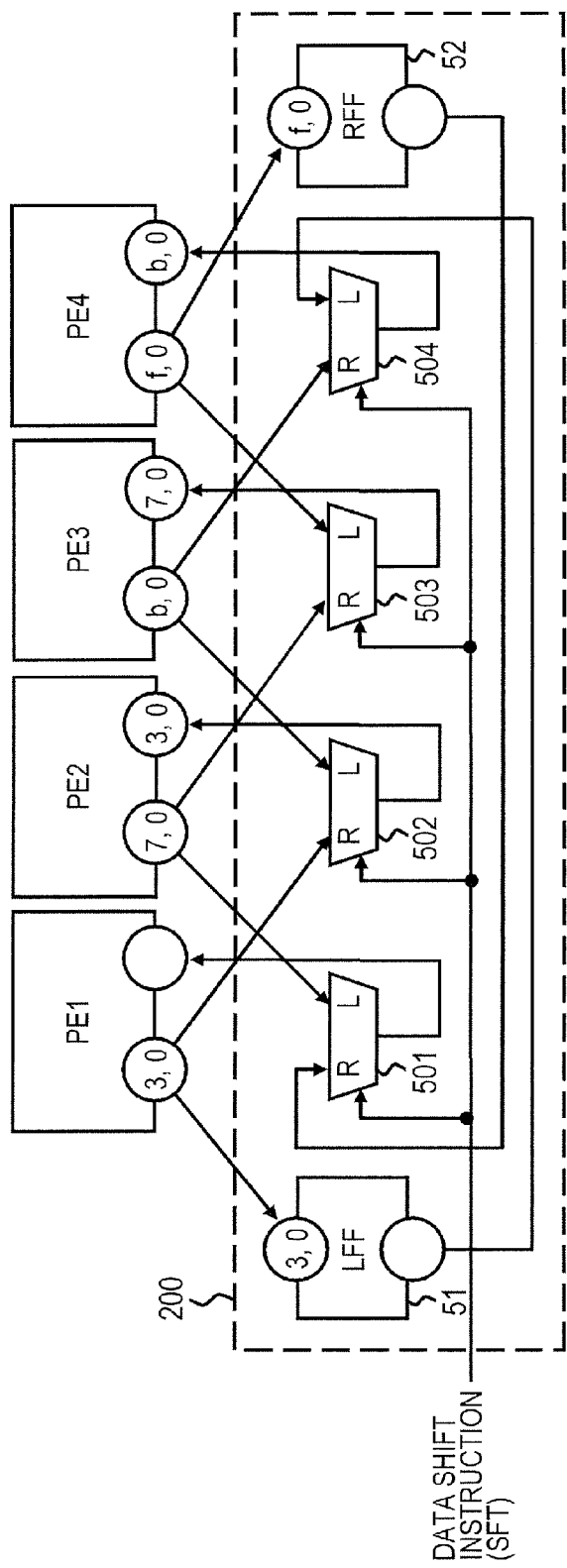
FIG. 17 is a diagram for explaining a state of the data transfer network at the time of completion of a first cycle operation in the semiconductor device according to the second embodiment.

Also in the semiconductor device 2 according to the second embodiment, before performing a concrete processing in the processor element, data is read from the common data memory 12 into the memories 121 to 124 of the processor elements PE1 to PE4*m* respectively. Thereupon, FIG. 16 shows a diagram for explaining the read operation of the data group into the memories 121 to 124 of the semiconductor device 2 according to the second embodiment. As shown in FIG. 16, in this operation example, the data that becomes the object of the data shift processing is stored spanning three word line addresses of the common data memory 12. In the semiconductor device 1, the data [0, 0] to [3, 0] are stored in an area of a word line address W1 of the memory 121 of the processor element PE1, data [0, 1] to [3, 1] are stored in an area of a word line address W2, and data [0, 2] to [3, 2] are stored in an area of a word line address W3. Moreover, the data [4, 0] to [7, 0] are stored in an area of the word line address W1 of the memory 122 of the processor element PE2, data [4, 1] to [7, 1] are stored in an area of the word line address W2, and data [4, 2] to [7, 2] are stored in an area of the word line address W3. Moreover, the data [8, 0] to [b, 0] are stored in an area of the word line address W1 of the memory 123 of the processor element PE3, data [8, 1] to [b, 1] are stored in an area of the word line address W2, and data [8, 2] to [b, 2] are stored in an area of the word line address W3. Moreover, data [c, 2] to [f, 2] are stored in an area of the word line address W1 of the memory 124 of the processor element PE4, data [c, 1] to [f, 1] are stored in an area of the word line address W2, and the data [c, 0] to [f, 0] are stored in an area of the word line address W3. That is, in the example shown in FIG. 16, three data groups each comprised of four pieces of data are stored in the memory of each processor element. Incidentally, each one of three data groups thus stored corresponds to the data group that indicates the transaction in the processor element, respectively. Next, in the semiconductor device 2 according to the second embodiment, the data shift processing of shifting data to the right is performed on the data (i.e., the data [0, 0] to [f, 0]) stored in an area indicated by the word line address W1 in the data groups stored in the memories 121 to 124. Since the data shift processing on the data stored in this area indicated by the word line address W1 is the same as the data shift processing explained in FIG. 9 to FIG. 12, its explanation is omitted here. Incidentally, in the following explanation, the data shift processing on the data stored in the area indicated by the word line address W1 of the memories 121 to 124 is the data shift processing of an operation example in the first cycle to be explained here, the data shift processing on the data stored in an area indicated by the word line address W2 is the data shift processing of the operation example in the second cycle to be explained here, and the data shift processing on the data stored in an area indicated by the word line address W3 is the data shift processing of the operation example in the third cycle to be explained here. Next, FIG. 17 shows a state of the data transfer network 200 at the time when an operation of the first cycle in the semiconductor device 2 according to the second embodiment has completed. As shown in FIG. 17, at the time when the processing of the first cycle has completed, the data [3, 0] outputted by the processor element PE1 is inputted into the flip-flop 51, and the data [f, 0] outputted by the processor element PE4 is inputted into the flip-flop 52. The flip-flops 51, 52 take in data inputted before the processing of the second cycle is started.

Figure 18:
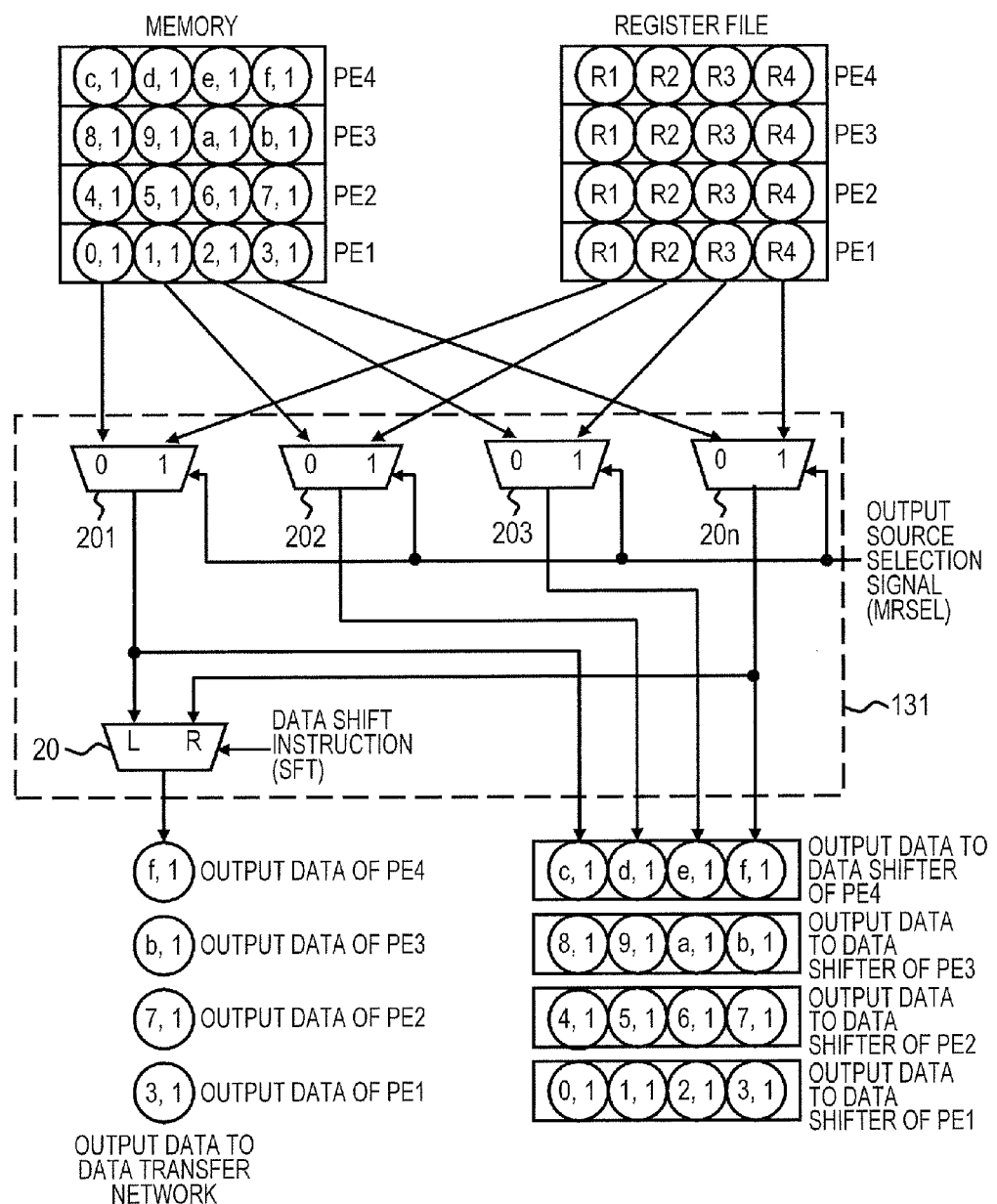
FIG. 18 is a diagram for explaining an operation of a data selector in a second cycle in the semiconductor device according to the second embodiment.

Next, an execution of the data shift instruction (SFT) on the data group stored in the area indicated by the word line address W2 of the memories 121 to 124 will be explained. First, operations of the data selectors 131 to 134 in response to the data shift instruction (SFT) will be explained. FIG. 18 shows a diagram for explaining an operation of the data selector in a second cycle of the semiconductor device 2. In an example shown in FIG. 18, the selectors 201 to 204 select the data outputted from the memory 121 according to zero being inputted as the output source selection signal (MRSEL). In the example shown in FIG. 18, the data [0, 1] to [3, 1] are given to the data shifter from the data selector in the processor element PE1, the data [4, 1] to [7, 1] are given to the data shifter from the data selector in the processor element PE2, the data [8, 1] to [b, 1] are given to the data shifter from the data selector in the processor element PE3, and the data [c, 1] to [f, 1] are given to the data shifter from the data selector in the processor element PE4.

Moreover, in the operation example, since the data shift instruction indicates the right direction as the data shift direction, the selector 20 outputs the data located at the end bit line address in the data group as the transfer data Dx. In the example shown in FIG. 18, the processor element PE1 outputs the data [3, 1] as the transfer data Dx, the processor element PE2 outputs the data [7, 1] as the transfer data Dx, the processor element PE3 outputs the data [b, 1] as the transfer data Dx, and the processor element PE4 outputs the data [f, 1] as the transfer data Dx.

Figure 19:
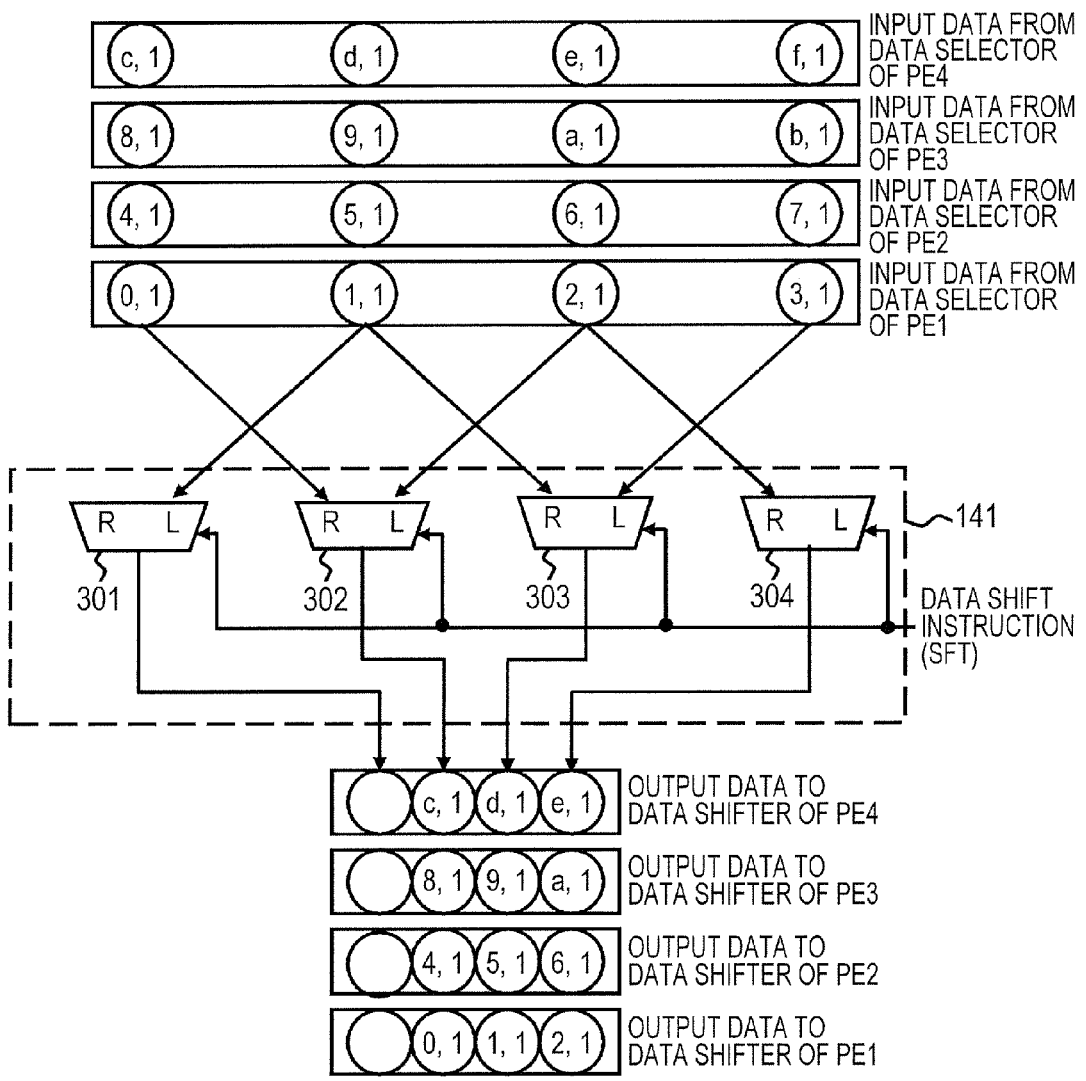
FIG. 19 is a diagram for explaining an operation of a data shifter in the second cycle in the semiconductor device according to the second embodiment.

Next, an operation of the data shifter in the second cycle will be explained. FIG. 19 shows a diagram for explaining the operation of the data shifter in the second cycle of the semiconductor device 2. In the operation example, since the data shift instruction indicates the right direction as the data shift direction, multiple selectors each shift the data group so that the bit line address corresponding to the inputted data may be increased by unity, respectively. Thereby, the processor element PE1 outputs the data [0, 1] to [2, 1] as the data D2 to D4, the processor element PE2 outputs the data [4, 1] to [6, 1] as the data D2 to D4, the processor element PE3 outputs the data [8, 1] to [a, 1] as the data D2 to D4, and the processor element PE4 outputs the data [c, 1] to [e, 1] as the data D2 to D4, Moreover, the processor elements PE1 to PE4 each output the state of no data as the data D1.

Figure 20:
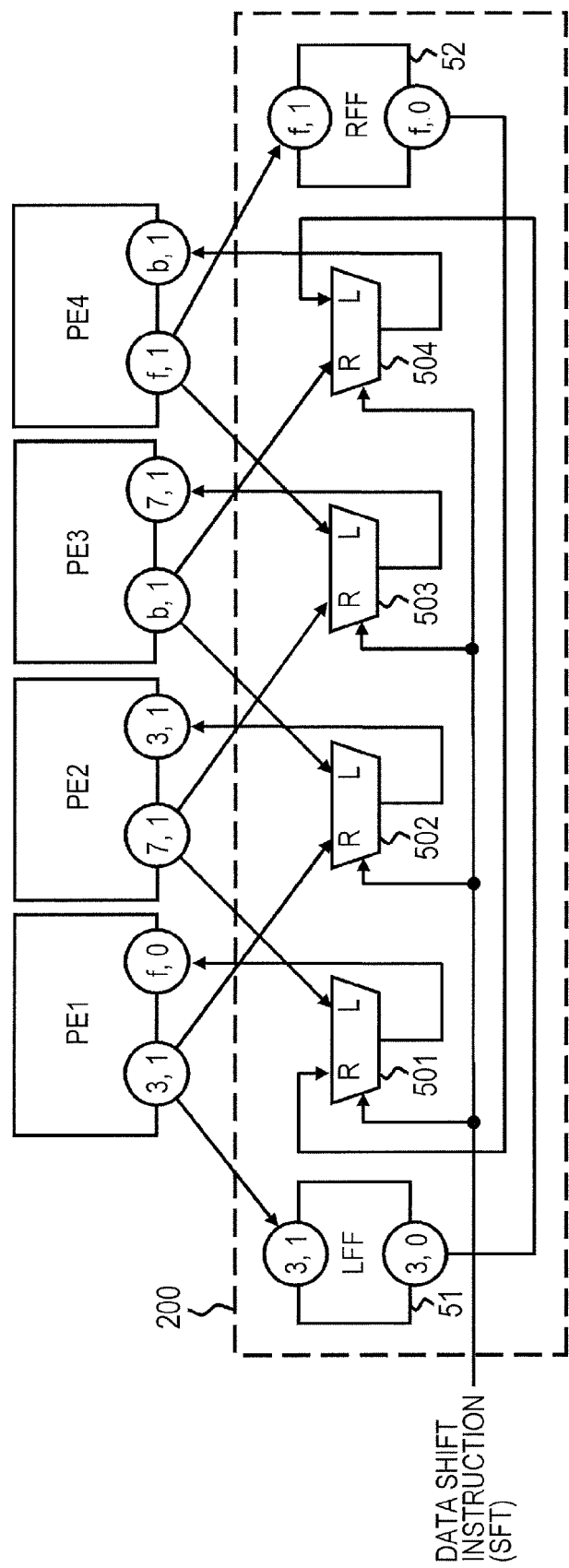
FIG. 20 is a diagram for explaining an operation of a data transfer network in the second cycle in the semiconductor device according to the second embodiment.

Next, an operation of the data transfer network 200 in the second cycle will be explained. FIG. 20 shows a diagram for explaining the operation of the data transfer network 200 of the semiconductor device 2. As shown in FIG. 20, since the data shift instruction indicates the right direction as the data shift direction in this operation example, the selectors 501 to 504 each select the transfer data Dx outputted by the processor element PE located on the right-hand side of the processor element that is an output destination of its own selector. At this time, the processor element PE4 corresponds to the processor element located on the right-hand side of the processor element PE1 in the data transfer network 200. Moreover, the data inputted into a terminal R of the selector 501 in an operation of the second cycle is the data that the processor element PE4 outputted in the operation of the first cycle. The selectors 501 to 504 each output the respectively selected transfer data to the processor element corresponding to its own selector.

More specifically, in an example shown in FIG. 20, the data [3, 1] that the processor element PE1 outputted is transferred to the processor element PE2, the data [7, 1] that the processor element PE2 outputted is transferred to the processor element PE3, the data [b, 1] that the processor element PE3 outputted is transferred to the processor element PE4, and the data [f, 0] that the processor element PE4 outputted in the operation of the first cycle is transferred to the processor element PE1.

Figure 21:
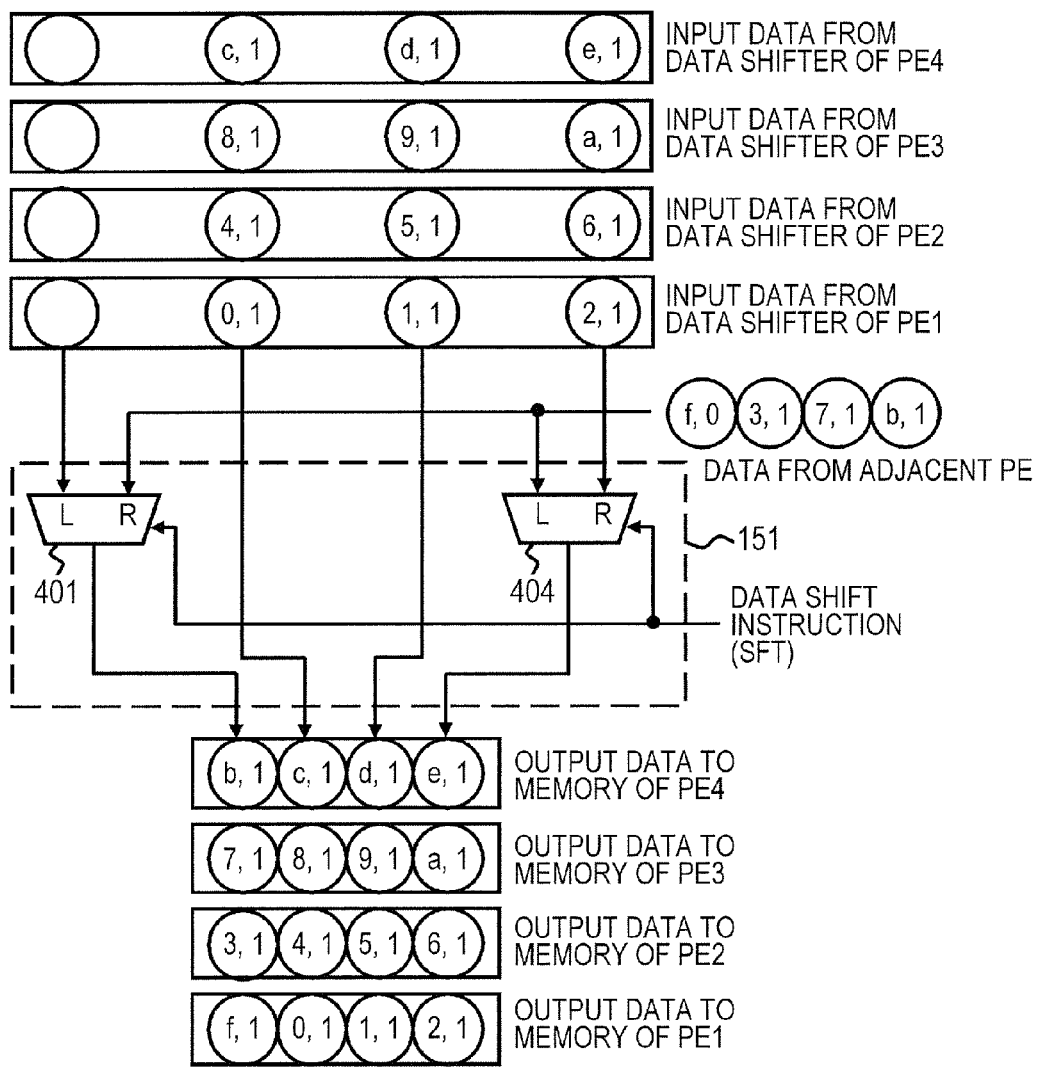
FIG. 21 is a diagram for explaining an operation of the data shifter in the second cycle in the semiconductor device according to the second embodiment.

Next, an operation of the data connector in the second cycle will be explained. FIG. 21 shows a diagram for explaining the operation of the data connector of the semiconductor device 2. As shown in FIG. 21, since the data shift instruction indicates the right direction as the data shift direction in this operation example, the selector outputs the data inputted into the input terminal on which the symbol of R is shown. That is, the selector 401 outputs the data outputted from the adjacent processor element. On the other hand, the selector 404 outputs the data D4 that the data shifter outputs.

Thereby, the data connector of the processor element PE1 outputs the data [f, 0] and [0, 1] to [2, 1] to the memory 121 as the data P1 to P4. Moreover, the data connector of the processor element PE2 outputs the data [3, 1] to [6, 1] to the memory 122 as the data P1 to P4, The data connector of the processor element PE3 outputs the data [7, 1] to [a, 1] to the memory 123 as the data P1 to P4, and the data connector of the processor element PE4 outputs the data [8, 1] to [e, 1] to the memory 124 as the data P1 to P4.

The data shift processing can be performed also on the data group in the third row by performing the operation explained in FIG. 17 to FIG. 21 also in the third cycle. Here, FIG. 22 shows a diagram showing transitions of memory states of the memories 121 to 124 for every cycle.

Figure 22:
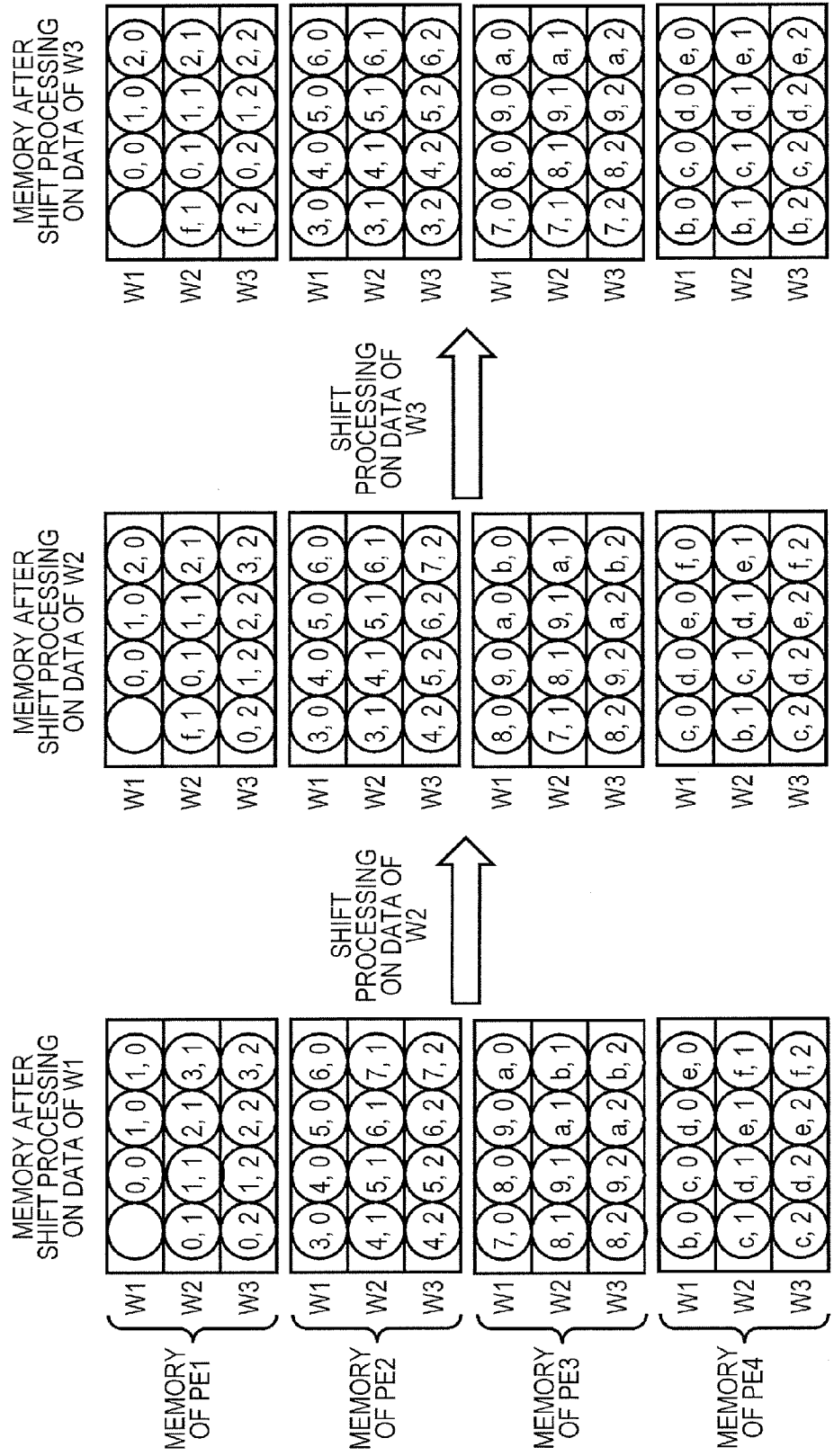
FIG. 22 is a diagram for explaining state transition of the memory in each cycle in the semiconductor device according to the second embodiment.

As shown in FIG. 22, the semiconductor device 2 according to the second embodiment performs the data shift processing on the data group stored in the area indicated by the word line address W1 in the first cycle.

Moreover, the semiconductor device 2 according to the second embodiment performs the data shift processing on the data group stored in the area indicated by the word line address W2 in the second cycle, and at the same time moves the end data stored in the area indicated by the word line address W1 to the location of the head data in the data area indicated by the word line address W2.

Moreover, the semiconductor device 2 according to the second embodiment performs the data shift processing on the data group stored in the area indicated by the word line address W3 in the third cycle, and at the same time moves the end data stored in the area indicated by the word line address W2 to the location of the head data in the area indicated by the word line address W3.

Figure 23:
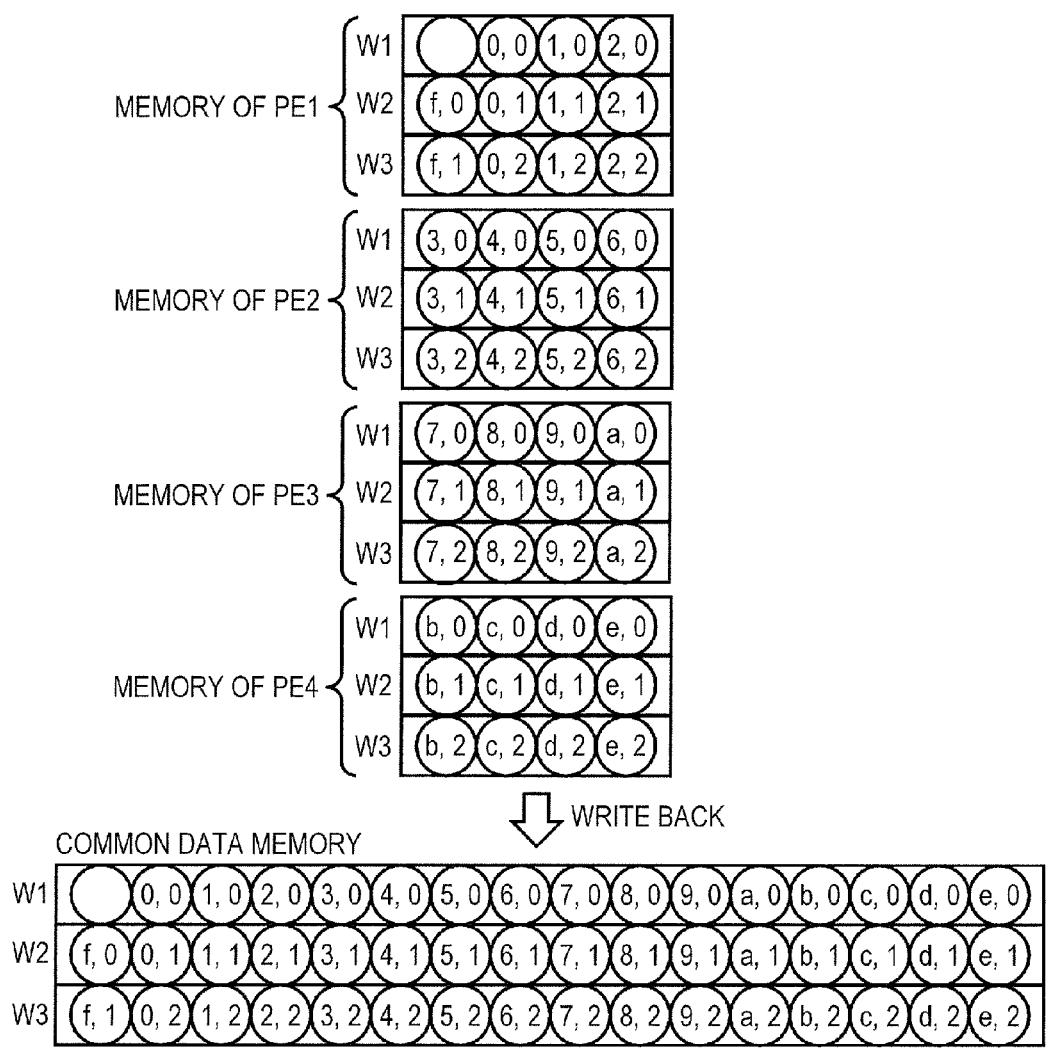
FIG. 23 is a diagram for explaining a write operation of a data group into common data memory from the memory of the semiconductor device according to the second embodiment.

Next, in the semiconductor device 2 according to the second embodiment, the data group that was subjected to the data shift processing using the processor elements PE1 to PE4 is written back to the common data memory 12. Thereupon, FIG. 23 shows a diagram for explaining the data group write operation into the common data memory 12 from the memory of the processor element. As shown in FIG. 23, the data after the writing-back becomes the data group that is shifted to the right by one address assuming that the data group stored being divided in three rows is made to be a data group in a single row.

From the above-mentioned explanation, in the semiconductor device 2 according to the second embodiment, the data transfer network 200 performs the data transfer between the processor elements located in both ends spanning the processing cycles. This enables the semiconductor device 2 to perform the data shift processing between the data groups belonging to different rows without performing the complicated arithmetic operation of holding separately the data to be moved in a temporary holding area etc. This processing is effective, for example, when handling an image of such a size as cannot be handled by a single cycle of processing of multiple processor elements.

Incidentally, the present invention is not limited to the above-mentioned embodiment, and can be appropriately modified within a range that does not deviate from a gist of the present invention.

What is claimed is:

1. A semiconductor device comprising:
a plurality of processor elements that divide data which is contiguous in one direction among a plurality of pieces of data defined as matrix data into a plurality of data groups for processing;
a processor element control unit that issues a data shift instruction to the processor elements; and
a data transfer network that performs data transfer between the processor elements which adjoin each other in a data shift direction indicated by the data shift instruction, wherein each of the processor elements includes:
a data storage unit that stores one of the data groups in an area defined by one word line address and that inputs/outputs the one of the data groups collectively in a unit of the word line address;
a data selector that selects either of data located at a head bit line address or data located at an end bit line address in the data group in response to the data shift instruction and that outputs the selected data into the data transfer network as transfer data;
a data shifter that shifts a bit line address at which the data group is stored to the right or to the left in response to the data shift instruction on the data group to be stored at one of the word line addresses; and
a data connector that connects the data group which is shifted by the data shifter and the transfer data obtained through the data transfer network and that stores the connected data in the data storage unit; wherein the data transfer network is provided correspondingly to the processor elements, and includes a plurality of selectors each of which outputs the transfer data outputted from the processor elements located on the both sides of the corresponding processor element to the corresponding processor element, and wherein the selectors each select the transfer data outputted from the processor element located in the data shift direction indicated by the data shift instruction, and each output the selected data to the corresponding processor element.

2. The semiconductor device according to claim 1, wherein the data transfer network includes:
a first temporary holding unit that temporarily holds the transfer data outputted by the head processor element located in one end part among the processor elements; and
a second temporary holding unit that temporarily holds the transfer data outputted by the end processor element located in the other end part among the processor elements,
wherein a head selector provided correspondingly to the head processor element among the selectors selects and outputs either of the transfer data that the second temporary holding unit holds or an output from the processor element located on the right-hand side of the head processor element according to the data shift instruction, and
wherein an end selector provided correspondingly to the end processor element among the selectors selects and outputs either of the transfer data that the first temporary holding unit holds or an output from the processor element located on the left-hand side of the end processor element according to the data shift instruction.

3. The semiconductor device according to claim 1, comprising:
instruction memory configured to store an instruction code,
wherein the processor element control unit decodes the instruction code and issues an operation instruction including the data shift instruction, and
wherein the processor elements each include an arithmetic logical unit that performs an arithmetic operation on the data group stored in the data storage unit of its own processor element according to the operation instruction.

4. The semiconductor device according to claim 3, wherein the data storage unit includes:
a register file configured to store the data group that the arithmetic logical unit processes; and memory configured to store the data group that is read in the register file, and wherein the data selector selects either of the register file or the memory based on an output source selection signal outputted with the data shift instruction.

5. A semiconductor device, comprising:

a plurality of processor elements each of which divides data that is contiguous in one direction among a plurality of pieces of data defined as matrix data into a plurality of data groups for processing;

a processor element control unit that issues a data shift instruction to the processor elements; and a data transfer network that performs data transfer between the processor elements which adjoin each other in a data shift direction indicated by the data shift instruction, wherein the processor elements each select one of the data groups in one cycle, select either of head data or end data of the selected data group according to the data shift instruction and output the selected data as transfer data into the data transfer network, perform a data shift processing of shifting a bit line address at which the data group is stored to the right or to the left according to the data shift instruction on the selected data group, and connect the data group subjected to the data shift processing and the transfer data obtained through the data transfer network and store the connected data in a data storage unit in its own processor element wherein the data transfer network includes: a plurality of selectors that are provided correspondingly to the processor elements and each output the transfer data outputted from the processor elements located on the both sides of the corresponding processor element to the corresponding processor element, and wherein the selectors each select the transfer data outputted from the processor element located in the data shift direction indicated by the data shift instruction and output it to the corresponding processor element.

6. The semiconductor device according to claim 5, wherein the data transfer network includes:

a first temporary holding unit that holds the transfer data outputted in a current cycle by a head processor element located at one end part among the processor elements until sampling timing of the next cycle; and a second temporary holding unit that holds the transfer data outputted in the current cycle by an end processor element located at the other end part among the processor elements until the sampling timing of the next cycle, wherein a head selector provided correspondingly to the head processor element among the selectors selects and outputs either of the transfer data that the second temporary holding unit holds or an output from a processor element located on the right-hand side of the head processor element according to the data shift instruction, and wherein an end selector provided correspondingly to the end processor element among the selectors selects and outputs either of the transfer data that the first temporary holding unit holds or an output from a processor element located on the left-hand side of the end processor element according to the data shift instruction.

* * * * *